US008044949B2

(12) United States Patent
Yamazaki

(10) Patent No.: US 8,044,949 B2
(45) Date of Patent: Oct. 25, 2011

(54) LIGHT EMITTING DEVICE AND ELECTRONIC APPARATUS FOR DISPLAYING IMAGES

(75) Inventor: Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 1347 days.

(21) Appl. No.: 11/381,266

(22) Filed: May 2, 2006

(65) Prior Publication Data

US 2006/0244699 A1 Nov. 2, 2006

(30) Foreign Application Priority Data

May 2, 2005 (JP) ................................ 2005-133807

(51) Int. Cl.
*G06F 3/038* (2006.01)

(52) U.S. Cl. ........................................ 345/211; 345/76

(58) Field of Classification Search ........................ None
See application file for complete search history.

(56) References Cited

U.S. PATENT DOCUMENTS 5,594,463 A 1/1997 Sakamoto
6,034,480 A * 3/2000 Browning et al. ......... 315/169.1
6,504,520 B1 * 1/2003 Osada et al. .................... 345/76
6,528,951 B2 3/2003 Yamazaki et al.
6,710,548 B2 3/2004 Kimura
6,720,198 B2 4/2004 Yamagata et al.
6,724,377 B2 4/2004 Ouchi et al.
6,788,003 B2 9/2004 Inukai et al.
6,853,370 B2 2/2005 Numao
6,885,385 B2 4/2005 Ouchi et al.
2001/0022565 A1 9/2001 Kimura
2001/0030511 A1 * 10/2001 Yamazaki et al. ............ 315/160
2002/0005696 A1 * 1/2002 Yamazaki et al. ......... 315/169.3
2002/0089496 A1 7/2002 Numao (Continued)

FOREIGN PATENT DOCUMENTS

JP 59123302 * 7/1984

(Continued)

OTHER PUBLICATIONS

A. Tagawa et al.; "A Novel Digital-Gray-Scale Driving Method with a Multiple Addressing Sequence for AM-OLED Displays"; *IDW '04*; pp. 279-282; 2004.

(Continued)

*Primary Examiner* — Alexander Eisen
*Assistant Examiner* — Matthew Yeung
(74) *Attorney, Agent, or Firm* — Fish & Richardson P.C.

(57) ABSTRACT

To solve degradation with time of a light emitting element by a new method. When the potential of an electrode of a monitor pixel is sampled and fed back to a light emitting pixel, degradation with time of a light emitting element can be corrected. In addition, when a writing period is divided into a plurality of periods during which a plurality of rows are selected, a gray scale can be expressed by a weighted light emitting period. That is to say, a light emitting device of the invention has a plurality of monitoring light emitting elements, a monitor line for monitoring changes in the potentials of electrodes of the plurality of light emitting elements, and a means for preventing, when any one of the plurality of monitoring light emitting elements is short-circuited, a current from flowing to the short-circuited monitoring light emitting element through the monitor line.

18 Claims, 26 Drawing Sheets

U.S. PATENT DOCUMENTS

| | | | | |
|---|---|---|---|---|
| 2002/0101395 | A1* | 8/2002 | Inukai | 345/83 |
| 2003/0132716 | A1* | 7/2003 | Yamazaki et al. | 315/169.3 |
| 2003/0197667 | A1 | 10/2003 | Numao | |
| 2003/0214467 | A1* | 11/2003 | Koyama et al. | 345/82 |
| 2004/0095300 | A1* | 5/2004 | So et al. | 345/82 |
| 2004/0100463 | A1* | 5/2004 | Miyagawa et al. | 345/212 |
| 2004/0178726 | A1 | 9/2004 | Yamagata et al. | |
| 2004/0263444 | A1 | 12/2004 | Kimura | |
| 2005/0012731 | A1 | 1/2005 | Yamazaki et al. | |
| 2005/0017963 | A1 | 1/2005 | Yamazaki et al. | |
| 2005/0017964 | A1 | 1/2005 | Yamazaki et al. | |
| 2005/0205880 | A1 | 9/2005 | Anzai et al. | |
| 2005/0285823 | A1 | 12/2005 | Kimura et al. | |
| 2006/0007218 | A1 | 1/2006 | Miyake et al. | |
| 2006/0033452 | A1 | 2/2006 | Yamazaki et al. | |
| 2006/0038501 | A1 | 2/2006 | Koyama et al. | |
| 2009/0224676 | A1 | 9/2009 | Osame et al. | |

FOREIGN PATENT DOCUMENTS

| | | | |
|---|---|---|---|
| JP | 2287492 | A | 11/1990 |
| JP | 4128875 | A | 4/1992 |
| JP | 5283748 | A | 10/1993 |
| JP | 7036409 | A | 2/1995 |
| JP | 11087774 | A | 3/1999 |
| JP | 2001-324958 | | 11/2001 |
| JP | 2002-108264 | | 4/2002 |
| JP | 2002-215092 | | 7/2002 |
| JP | 2002278498 | A | 9/2002 |
| JP | 2002-297094 | | 10/2002 |
| JP | 2002-318546 | | 10/2002 |
| JP | 2003317944 | A | 11/2003 |
| JP | 2004-004501 | | 1/2004 |
| JP | 2004170943 | A | 6/2004 |
| WO | WO2004040541 | A1 | 5/2004 |
| WO | WO 2006/011666 | A1 | 2/2006 |

OTHER PUBLICATIONS

International Search Report issued in PCT/JP2005/014968, dated Nov. 22, 2005.

Written Opinion issued in PCT/JP2005/014968, dated Nov. 22, 2005.

* cited by examiner

FIG. 10A
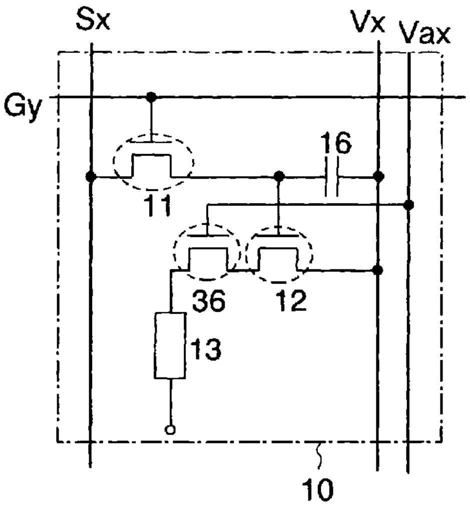
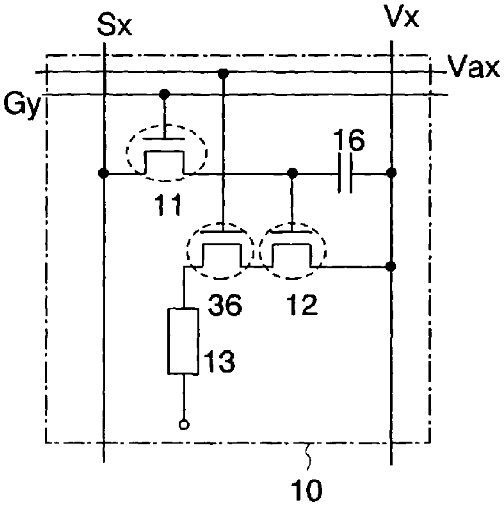
FIG. 10B
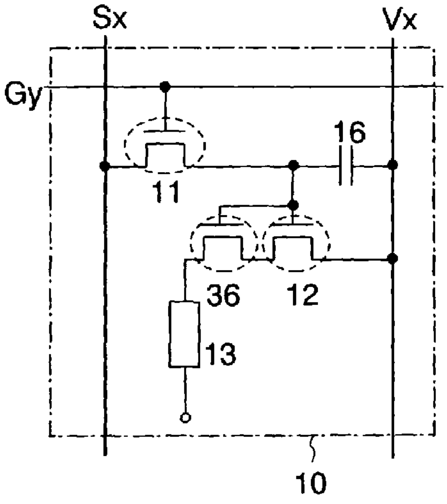
FIG. 10C

LIGHT EMITTING DEVICE AND ELECTRONIC APPARATUS FOR DISPLAYING IMAGES

BACKGROUND OF THE INVENTION

1. Field of the Invention

The present invention relates to a light emitting device having a self-light emitting element, and a driving method thereof. The invention also relates to an electronic apparatus having a light emitting device including a self-light emitting element.

2. Description of the Related Art

In recent years, a light emitting device having a light emitting element typified by an EL (Electro Luminescence) element has been developed, and it is expected to be widely used by taking advantages of the self-light emitting type, such as high image quality, wide viewing angle, thin thickness, and lightweight.

In such a light emitting element, degradation with time or an initial defect may occur. In order to prevent degradation with time and an initial defect, suggested is a method where the surface of an anode is swabbed by a PVA (polyvinyl alcohol)-based porous body or the like so as to be planarized and remove dusts when a light emitting element is manufactured (see Patent Document 1).

As a driving method of the light emitting device, suggested is a digital time gray scale method where one frame is divided into a plurality of subframes and a gray scale is expressed depending on a light emitting period that is obtained by combining the subframes each weighted to have different lengths of light emission (see Patent Document 2, Patent Document 3, Patent Document 4, Patent Document 5, and Patent Document 6)

[Patent Document 1] Japanese Patent Laid-Open No. 2002-318546

[Patent Document 2] Japanese Patent Laid-Open No. 2004-4501

[Patent Document 3] Japanese Patent Laid-Open No. 2002-108264

[Patent Document 4] Japanese Patent Laid-Open No. 2001-324958

[Patent Document 5] Japanese Patent Laid-Open No. 2002-215092

[Patent Document 6] Japanese Patent Laid-Open No. 2002-297094

SUMMARY OF THE INVENTION

It is a primary object of the invention to solve the degradation with time and initial defect of a light emitting element by a new method that is different from the method disclosed in Patent Document 1.

According to one mode of the invention, a light emitting device for displaying an image by dividing one frame into a plurality of subframes has a current source; a first wire; a second wire; a third wire; a fourth wire; a first light emitting element; a second light emitting element; a first transistor including a source and a drain one of which is electrically connected to the second wire and the other is electrically connected to one electrode of the second light emitting element; a second transistor including a source and a drain one of which is electrically connected to a gate of the first transistor and the other is electrically connected to the third wire, and a gate that is electrically connected to the fourth wire; a circuit for supplying current from the current source to the first light emitting element through the first wire, a circuit for supplying a potential generated using a potential of the first wire to the second wire; and a circuit for selecting the fourth wire more than once in any one period of the plurality of subframes.

According to another mode of the invention, a light emitting device for displaying an image by dividing one frame into a plurality of subframes has a current source; a first wire; a second wire; a third wire; a fourth wire; a first light emitting element; a second light emitting element; a first transistor including a source and a drain one of which is electrically connected to the second wire and the other is electrically connected to one electrode of the second light emitting element; a second transistor including a source and a drain one of which is electrically connected to a gate of the first transistor and the other is electrically connected to the third wire, and a gate that is electrically connected to the fourth wire; a circuit for supplying current from the current source to the first light emitting element through the first wire; a circuit for interrupting current supply to the first light emitting element when one electrode of the first light emitting element is short-circuited to the other electrode thereof; a circuit for supplying a potential generated using a potential of the first wire to the second wire; and a circuit for selecting the fourth wire more than once in any one period of the plurality of subframes.

According to another mode of the invention, a light emitting device for displaying an image by dividing one frame into a plurality of subframes has a current source; a first wire; a second wire; a third wire; a fourth wire; a first light emitting element; a second light emitting element; a third transistor including a source and a drain one of which is electrically connected to the first wire and the other is electrically connected to one electrode of the first light emitting element; a first transistor including a source and a drain one of which is electrically connected to the second wire and the other is electrically connected to one electrode of the second light emitting element; a second transistor including a source and a drain one of which is electrically connected to a gate of the first transistor and the other is electrically connected to the third wire, and a gate that is electrically connected to the fourth wire; a circuit for supplying current from the current source to the first light emitting element through the first wire; a circuit for turning the third transistor off when one electrode of the first light emitting element is short-circuited to the other electrode thereof; a circuit for supplying a potential generated using a potential of the first wire to the second wire; and a circuit for selecting the fourth wire more than once in any one period of the plurality of subframes.

According to another mode of the invention, a light emitting device for displaying an image by dividing one frame into a plurality of subframes has a current source; a first wire; a second wire; a third wire; a fourth wire; a first light emitting element; a second light emitting element; a third transistor including a source and a drain one of which is electrically connected to the first wire and the other is electrically connected to one electrode of the first light emitting element; an inverter including an input terminal that is electrically connected to the other of the source and the drain of the third transistor and an output terminal that is electrically connected to a gate of the third transistor; a first transistor including a source and a drain one of which is electrically connected to the second wire and the other is electrically connected to one electrode of the second light emitting element; a second transistor including a source and a drain one of which is electrically connected to a gate of the first transistor and the other is electrically connected to the third wire, and a gate that is electrically connected to the fourth wire; a circuit for supplying current from the current source to the first light emitting element through the first wire; a circuit for supplying a potential generated using a potential of the first wire to the second wire; and a circuit for selecting the fourth wire more than once in any one period of the plurality of subframes.

The wires and the electrodes are made of one or more of elements selected from a group consisting of aluminum (Al), tantalum (Ta), titanium (Ti), molybdenum (Mo), tungsten (W), neodymium (Nd), chromium (Cr), nickel (Ni), platinum (Pt), gold (Au), silver (Ag), copper (Cu), magnesium (Mg), scandium (Sc), cobalt (Co), zinc (Zn), niobium (Nb), silicon (Si), phosphorus (P), boron (B), arsenic (As), gallium (Ga), indium (In), tin (Sn), and oxygen (O), a compound or an alloy material containing one or more of elements selected from the group (e.g., indium tin oxide (ITO), indium zinc oxide (IZO), indium tin oxide added with silicon oxide, zinc oxide (ZnO), aluminum neodymium (Al—Nd), magnesium silver (Mg—Ag), and the like), or a substance combining these compounds. Alternatively, the wires and the electrodes are made of a compound (silicide) of the elements selected from the group and silicon (e.g., aluminum silicon, molybdenum silicon, nickel silicide, and the like), or a compound of the elements selected from the group and nitrogen (e.g., titanium nitride, tantalum nitride, molybdenum nitride, and the like).

Silicon (Si) may contain a large amount of N-type impurity (such as phosphorus) or P-type impurity (such as boron). When these impurities are contained, silicon is easily used for wires and electrodes since the conductivity of silicon is increased and silicon acts as a normal conductor. Silicon may be single crystalline silicon, polycrystalline silicon, or amorphous silicon. When single crystalline silicon or polycrystalline silicon is used, resistance can be reduced. When amorphous silicon is used, manufacturing steps can be simplified.

Tungsten is desirably used because of its high heat resistance. Neodymium is also desirably used because of its high heat resistance. In particular, an aluminum-neodymium alloy is desirably used since the heat resistance increases and the formation of hillocks in aluminum can be suppressed. Silicon is desirably used since it can be formed simultaneously with a semiconductor layer of a transistor and it has high heat resistance. Indium tin oxide (ITO), indium zinc oxide (IZO), indium tin oxide added with silicon oxide, zinc oxide (ZnO), and silicon (Si) are desirably used since they transmit light. They may be used for a portion that transmits light, for example, such as a pixel electrode and a common electrode.

These materials may have a single layer structure or a multilayer structure to form a wire and an electrode. When a single layer structure is adopted, manufacturing steps can be simplified and the number of manufacturing days can be reduced, leading to cost savings. Meanwhile, when a multilayer structure is adopted, the advantages of respective materials can be utilized and the disadvantages thereof can be reduced, thereby forming high-performance wire and electrode.

For example, when a low resistance material (such as aluminum) is included in a multilayer structure, the resistance of a wire can be reduced. Alternatively, when using a high heat resistance material, a stacked structure where a material that does not have a high heat resistance but has other advantages is sandwiched between the high heat resistance materials may be adopted for example, which increases the heat resistance of wire and electrode as a whole. For example, it is desirable to use a stacked structure where a layer containing aluminum is sandwiched between layers each containing molybdenum or titanium. If a wire or electrode is partially in direct contact with another wire or electrode made of a different material, these wires or electrodes may adversely affect each other. For example, a material of one wire or electrode may enter a material of the other wire or electrode to change the characteristics thereof. Accordingly, the intended purpose is prevented from being fulfilled, or problems occur in manufacturing and manufacturing steps cannot be completed normally. In such a case, the problems can be solved by sandwiching a layer between other layers or covering a layer with another layer. For example, if indium tin oxide (ITO) is brought into contact with aluminum, titanium or molybdenum is desirably sandwiched therebetween. Also, if silicon is brought into contact with aluminum, titanium or molybdenum is desirably sandwiched therebetween.

The polarity of the first transistor is desirably the same as the polarity of the third transistor. For example, if the first transistor has P-type conductivity, the third transistor desirably has P-type conductivity, and if the first transistor has N-type conductivity, the third transistor desirably has N-type conductivity.

If the second transistor has N-type conductivity, the fourth wire is at H level when it is selected while at L level when it is not selected. Thus, the second transistor is turned on when the fourth wire is selected, and the second transistor is turned off when the fourth wire is not selected.

If the second transistor has P-type conductivity, the fourth wire is at L level when it is selected while at H level when it is not selected. Thus, the second transistor is turned on when the fourth wire is selected, and the second transistor is turned off when the fourth wire is not selected.

The fourth wire is desirably selected by a decoder circuit more than once in any one period of a plurality of subframes. This may also be achieved by a plurality of scan line selection circuits (including a shift register) and a circuit for controlling whether a selection signal of the plurality of scan line selection circuits is outputted to the fourth wire instead of the decoder circuit.

The circuit for supplying to the second wire a potential equal to the potential of the first wire or a potential generated using the potential of the first wire may be a buffer amplifier circuit including a first input terminal that is electrically connected to the first wire, a second input terminal that is electrically connected to an output terminal, and the output terminal that is electrically connected to the second wire.

A switch may be provided between the first input terminal of the buffer amplifier circuit and the first wire. This is because the potential of the first wire can be supplied to the first input terminal of the buffer amplifier circuit only when the potential of the first wire is in a steady state. At this time, a capacitor may be connected to the first input terminal of the buffer amplifier circuit. By connecting the capacitor, the buffer amplifier circuit can operate stably using a potential held in the capacitor even when the switch is turned off.

As a driving method of the light emitting device of the invention, a data signal may be supplied to the third wire more than once, thereby weighting light emitting periods of the plurality of subframes.

As another driving method of the light emitting device of the invention, the plurality of subframes may have at least one non-light emitting period. When a non-light emitting period is provided in one frame period, flicker that is the problem of image distortion can be suppressed and a light emitting device with high quality can be provided.

The data signal may be an analog voltage or a digital voltage.

In the invention, the first light emitting element is desirably formed on the same substrate and by the same manufacturing step as the second light emitting element.

A switch shown in the invention may have various modes. As an example, an electrical switch or a mechanical switch may be used. That is to say, a switch is not specifically limited as long as it can control the current flow. For example, a switch may be a transistor, a diode (a PN diode, a PIN diode, a Schottky diode, a diode-connected transistor, or the like), or a logic circuit combining them.

Accordingly, when a transistor is used as a switch, the polarity (conductivity) of the transistor is not specifically limited since it operates only as a switch. However, when an off-current is desirably small, it is desirable to use a transistor having a polarity with a small off-current. For example, a transistor having an LDD region, a multi-gate structure or the like has a small off-current. Further, when the potential of a source terminal of a transistor functioning as a switch is close to that of a low potential side power supply (Vss, GND, 0 V, or the like), an N-channel transistor is desirably used. On the other hand, when the potential of a source terminal of a transistor functioning as a switch is close to that of a high potential side power supply (Vdd, or the like), a P-channel transistor is desirably used. This allows the transistor to operate efficiently as a switch because the absolute value of a gate-source voltage can be increased. Note that a CMOS switch may be formed using both an N-channel transistor and a P-channel transistor. A CMOS switch can operate normally even in the case where the circumstances change such as the case where a voltage outputted through the switch (i.e., an input voltage to the switch) is higher or lower than an output voltage.

In the invention, "connection" includes electrical connection and direct connection. Accordingly, in the structures disclosed in the invention, other elements capable of electrical connection (such as a switch, a transistor, a capacitor, an inductor, a resistor, and a diode) may be provided between the predetermined connections. Alternatively, elements may be directly connected without other elements sandwiched therebetween.

A display element, a light emitting element, a display device, and a light emitting device may have various modes or various elements. For example, it is possible to adopt a display medium where the contrast is changed by an electrical or magnetic effect, such as an EL element (an organic EL element, an inorganic EL element, or an EL element containing an organic compound and an inorganic compound), an electron emitting element, a liquid crystal element, an electronic ink, a grating light valve (GLV), a plasma display (PDP), a Digital Micromirror Device (DMD), a piezoelectric ceramic display, and a carbon nanotube.

A display device using an EL element includes an EL display. A display device using an electron emitting element includes a field emission display (FED), a surface-conduction electron-emitter display (SED), and the like. A display device using a liquid crystal element includes a liquid crystal display, a transmissive liquid crystal display, a semi-transmissive liquid crystal display, and a reflective liquid crystal display. A display device using an electronic ink includes an electronic paper.

In the invention, a transistor may have various modes; therefore, the type of applicable transistor is not specifically limited. It is thus possible to use a thin film transistor (TFT) using a non-single crystalline semiconductor film typified by amorphous silicon and polycrystalline silicon, a MOS transistor using a semiconductor substrate or an SOI substrate, a junction transistor, a bipolar transistor, a transistor using a compound semiconductor such as ZnO and a-InGaZnO, a transistor using an organic semiconductor or a carbon nanotube, and other transistors. Note that a non-single crystalline semiconductor film may contain hydrogen or halogen.

Further, the type of substrate on which a transistor is provided is not specifically limited and various types of substrates may be used. For example, a transistor may be formed on a single crystalline substrate, an SOI substrate, a glass substrate, a quartz substrate, a plastic substrate, a paper substrate, a cellophane substrate, a stone substrate, or the like. Alternatively, after a transistor is formed on a substrate, it may be transferred onto another substrate.

The structure of a transistor is not specifically limited and various modes may be adopted. For example, it is possible to adopt a multi-gate structure having two or more gates. When using the multi-gate structure, an off-current can be reduced, the withstand voltage of a transistor can be increased to improve reliability, and variations in characteristics can be suppressed when the transistor operates in the saturation region since a drain-source current does not change much even when a drain-source voltage changes. Alternatively, gate electrodes may be provided on and under a channel. The structure where gate electrodes are provided on and under a channel allows a channel region to be increased; therefore, a current value can be increased and a depletion layer is easily formed to reduce the subthreshold coefficient. Further, a gate electrode may be provided on a channel or a under a channel. A staggered structure or a reversed staggered structure may be adopted. A channel region may be divided into a plurality of regions, and these regions may be connected in parallel or in series. A source electrode or a drain electrode may overlap a channel (or a part of it). The structure where a source electrode or a drain electrode overlaps a channel (or a part of it) prevents charges from being accumulated in a part of the channel, which may cause unstable operation. In addition, an LDD region may be provided. When providing the LDD region, an off-current can be reduced, the withstand voltage of a transistor can be increased to improve reliability, and variations in characteristics can be suppressed when the transistor operates in the saturation region since a drain-source current does not change much even when a drain-source voltage changes.

As set forth above, any type of transistor may be used in the invention and a transistor may be formed on any type of substrate. Accordingly, all circuits may be formed on a glass substrate, a plastic substrate, a single crystalline substrate, an SOI substrate, or other substrates.

When the circuits are all provided on a substrate, the number of components can be reduced to save costs, or the number of connections to circuit components can be reduced to improve reliability. Alternatively, a part of the circuits may be formed on a substrate, and the other part of the circuits may be formed on another substrate. In other words, not all the circuits are required to be formed on the same substrate. For example, a part of the circuits may be formed on a glass substrate using transistors, another part of the circuits may be formed as an IC chip on a single crystalline substrate, and the IC chip may be connected onto the glass substrate by COG (Chip On Glass). Alternatively, the IC chip may be connected to the glass substrate by TAB (Tape Auto Bonding) or using a printed circuit board. By thus forming a part of the circuits on the same substrate, the number of components can be reduced to save costs, and the number of connections to circuit components can be reduced to improve reliability. Meanwhile, a portion with a high driving voltage and a portion with a high driving frequency, which consume much power, may be formed on another substrate to prevent the power consumption from increasing.

In the invention, one pixel means one element for controlling brightness. As an example, one pixel means one color element to express the brightness. Accordingly, in the case of a color display device including R (red), G (green), and B (blue) color elements, the smallest unit of an image is constituted by three pixels: R pixel, G pixel, and B pixel. Note that the number of color elements is not limited to three, and more color elements may be used. For example, RGBW (W: white), RGB added with yellow, cyan, or magenta, and the like may be employed.

As another example, if the brightness of one color element is controlled using a plurality of regions, one of the regions is referred to as one pixel. In the case of an area gray scale where the brightness of each color element is controlled using a plurality of regions and a gray scale is expressed by all the regions, one pixel means one of the regions for controlling brightness. In that case, one color element is constituted by a plurality of pixels. Further, in that case, each pixel may have a different size area that contributes to display. In addition, slightly different signals may be supplied to a plurality of regions for controlling the brightness of one color element, namely, a plurality of pixels constituting one color element, thereby increasing the viewing angle.

In the invention, pixels may be arranged (arrayed) in matrix. Pixels arranged (arrayed) in matrix include pixels arranged in a striped grid pattern. Pixels arranged in matrix also include the case where three color elements (e.g., RGB) are used for full color display and dots of the three color elements are arranged in a delta pattern, or a Bayer pattern. Note that the number of color elements is not limited to three and more color elements may be used. For example, RGBW (W: white), RGB added with yellow, cyan, or magenta, and the like may be employed. The size of a light emitting region may be different in each dot of color elements.

A transistor is an element having at least three terminals including a gate, a drain, and a source. A channel region is provided between a drain region and a source region. It is difficult to distinguish between the source and the drain since they change depending on the structure, operating conditions, and the like of a transistor. Therefore, in the invention, regions functioning as a source and a drain are not referred to as a source and a drain in some cases, and in that case, as an example, they are referred to as one of a source and a drain and the other of the source and the drain.

A gate means the whole or part of a gate electrode and a gate wire (also referred to as a gate line or a gate signal line). A gate electrode means a conductive film that overlaps a semiconductor constituting a channel region, an LDD (Lightly Doped Drain) region, and the like, with a gate insulating film interposed therebetween. A gate wire means a wire for connecting gate electrodes of pixels or connecting a gate electrode to another wire.

However, there is a portion that functions both as a gate electrode and as a gate wire. Such a portion may be referred to as a gate electrode or a gate wire. That is to say, there is no clear distinction between a gate electrode and a gate wire in some regions. For example, if a channel region overlaps an extending gate wire, the region functions both as a gate wire and as a gate electrode. Accordingly, such a region may be referred to as a gate electrode or a gate wire.

In addition, a region that is formed of the same material as a gate electrode and connected to the gate electrode may also be referred to as a gate electrode. Similarly, a region that is formed of the same material as a gate wire and connected to the gate wire may also be referred to as a gate wire. Strictly speaking, such a region does not overlap a channel region or does not have a function of connecting to another gate electrode in some cases. However, some regions are formed of the same material as a gate electrode or a gate wire and connected to the gate electrode or the gate wire depending on manufacturing margins and the like. Therefore, such a region may be referred to as a gate electrode or a gate wire.

For example, in a multi-gate transistor, a gate electrode of one transistor is often connected to a gate electrode of another transistor with a conductive film that is formed of the same material as the gate electrode. Such a region may be referred to as a gate wire since it connects gate electrodes to each other, or may be referred to as a gate electrode since a multi-gate transistor can be considered to be one transistor. That is to say, a region that is formed of the same material of a gate electrode or a gate wire and connected thereto may be referred to as a gate electrode or a gate wire. In addition, for example, a conductive film where a gate electrode is connected to a gate wire may be referred to as a gate electrode or a gate wire.

Note that a gate terminal means part of a gate electrode region or part of a region that is electrically connected to a gate electrode.

A source means the whole or part of a source region, a source electrode, and a source wire (also referred to as a source line, a source signal line, or the like). A source region means a semiconductor region containing a high concentration of a P-type impurity (such as boron and gallium) or an N-type impurity (such as phosphorus and arsenic). Accordingly, a source region does not include a region containing a low concentration of a P-type impurity or an N-type impurity, namely a so-called LDD (Lightly Doped Drain) region. A source electrode means a conductive layer that is formed of a material different from that of a source region and electrically connected to the source region. A source electrode includes a source region in some cases. A source wire means a wire for connecting source electrodes of pixels or connecting a source electrode to another wire.

However, there is a portion that functions both as a source electrode and as a source wire. Such a portion may be referred to as a source electrode or a source wire. That is to say, there is no clear distinction between a source electrode and a source wire in some regions. For example, if a source region overlaps an extending source wire, the region functions both as a source wire and as a source electrode. Accordingly, such a region may be referred to as a source electrode or a source wire.

In addition, a region that is formed of the same material as a source electrode and connected to the source electrode, or a portion connecting source electrodes to each other may also be referred to as a source electrode. Further, a portion that overlaps a source region may be referred to as a source electrode. Similarly, a region that is formed of the same material as a source wire and connected to the source wire may also be referred to as a source wire. Strictly speaking, such a region does not have a function of connecting to another source electrode in some cases. However, some regions are formed of the same material as a source electrode or a source wire and connected to the source electrode or the source wire depending on manufacturing margins and the like. Therefore, such a region may be referred to as a source electrode or a source wire.

In addition, for example, a conductive film where a source electrode is connected to a source wire may be referred to as a source electrode or a source wire.

Note that a source terminal means part of a source region, a source electrode, or a region that is electrically connected to a source electrode.

The description of the source applies to the drain.

In the invention, a semiconductor device means a device having a circuit including a semiconductor element (such as a transistor and a diode). The semiconductor device may include any device that can function by utilizing semiconductor characteristics. A display device means a device having a display element (such as a liquid crystal element and a light emitting element). The display device may include a whole display panel where a plurality of pixels each having a display element such as a liquid crystal element and an EL element and a peripheral driver circuit for driving the pixels are formed on a substrate. The display device may also include a device attached with a flexible printed circuit (FPC) or a printed wiring board (PWB), such as an IC, a resistor, a capacitor, an inductor, and a transistor. Further, the display device may include an optical sheet such as a polarizer and a retardation plate. In addition, the display device may include a backlight (which may include a light conducting plate, a prism sheet, a diffusion sheet, a reflection sheet, or a light source (such as an LED and a cold cathode tube)). A light emitting device includes a display device having a self-light emitting display element in particular, such as an EL element and an element used for an FED. A liquid crystal display device includes a display device having a liquid crystal element.

In the invention, the word “on”, such as in the phrase “formed on something” is not limited to the case of being directly formed on something, and includes the case of being formed on something with another thing interposed therebetween. Accordingly, the phrase “a layer B is formed on a layer A” includes the case where the layer B is formed directly on the layer A and the case where another layer (such as a layer C and a layer D) is formed directly on the layer A and the layer B is formed directly on the layer. The same applies to the word “over”, and the word is not limited to the case of being directly formed on something, and includes the case of being formed on something with another thing interposed therebetween. Accordingly, the phrase “a layer B is formed over a layer A” includes the case where the layer B is formed directly on the layer A and the case where another layer (such as a layer C and a layer D) is formed directly on the layer A and the layer B is formed directly on the layer. Note that the same applies to the word “under” or the word “below”, and these words include the case of being directly formed under or below something, and the case of being formed under or below something with another thing interposed therebetween.

According to the invention, a light emitting device where luminance variations due to changes in ambient temperature or degradation with time are reduced can be provided.

BRIEF DESCRIPTION OF DRAWINGS

FIGS. 10A to 10C each shows an equivalent circuit of a pixel of the invention.

DETAILED DESCRIPTION OF THE INVENTION

Figure 1:
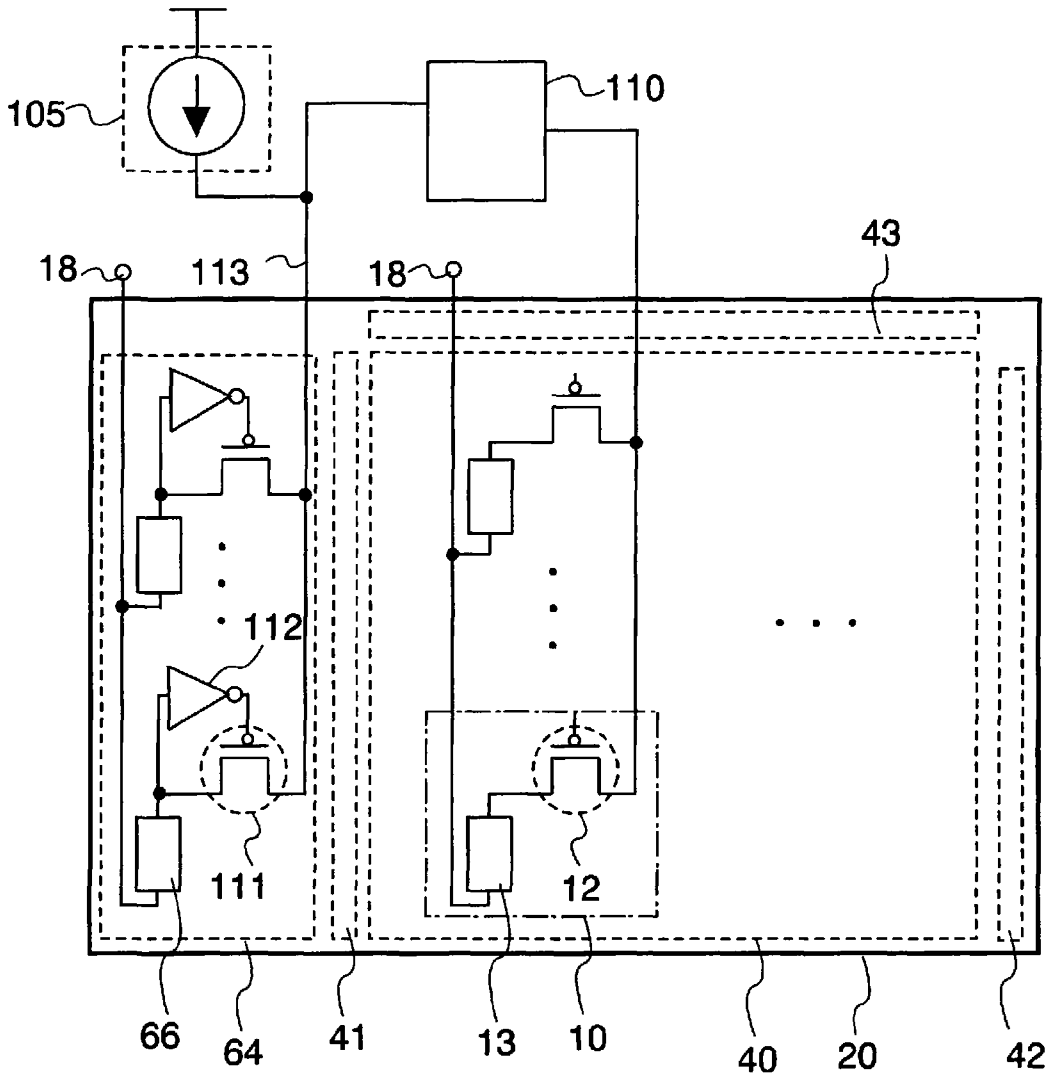
FIG. 1 shows a light emitting device of the invention.

Although the invention will be described by way of embodiment modes with reference to the accompanying drawings, it is to be understood that various changes and modifications will be apparent to those skilled in the art. Therefore, unless such changes and modifications depart from the scope of the invention, they should be construed as being included therein. Note that in all the drawings for illustrating the embodiment modes, the identical portions or portions having similar function are denoted by the same reference numerals, and description thereon is not repeated.

In this specification, connection between elements means electrical connection. Therefore, elements may be connected to each other with a semiconductor element, a switching element or the like interposed therebetween.

Further, in this specification, the words “source electrode” and “drain electrode” of a transistor are used for distinguishing electrodes other than a gate electrode for convenience in the structure of the transistor. In the invention, if the polarity of a transistor is not specifically limited, the words “source electrode” and “drain electrode” change depending on the polarity. Accordingly, a source electrode and a drain electrode may be referred to as one electrode or the other electrode.

Embodiment Mode 1

Described in this embodiment mode is a structure of a light emitting device having a monitoring light emitting element.

FIG. 1 shows a pixel portion 40, a signal line driver circuit 43, a first scan line driver circuit 41, a second scan line driver circuit 42, and a monitor circuit 64, which are provided on an insulating substrate 20.

The pixel portion 40 includes a plurality of pixels 10 each of which has a light emitting element 13 and a transistor (hereinafter referred to as a driving transistor) 12 that is connected to the light emitting element 13 and has a function of controlling current supply. The light emitting element 13 is connected to a power supply 18 denoted by a circle. The structure of the pixel 10 is more specifically described in the following embodiment mode.

The monitor circuit 64 includes a monitoring light emitting element 66, a transistor (hereinafter referred to as a monitor controlling transistor) 111 connected to the monitoring light emitting element 66, and an inverter 112 having an output terminal connected to a gate electrode of the monitor controlling transistor and an input terminal connected to one electrode of the monitor controlling transistor and the monitoring light emitting element. The monitor controlling transistor 111 is connected to a constant current source 105 through a monitoring current line (hereinafter referred to as a monitor line) 113. The monitor controlling transistor 111 has a function of controlling current supply from the monitor line 113 to each of the monitoring light emitting elements 66. The monitor line 113 is connected to electrodes of the monitoring light emitting elements 66 through the transistor, and thus can monitor changes in potential of the electrodes. The constant current source 105 is only required to have a function of supplying a constant current to the monitor line 113.

The monitoring light emitting element 66 is formed under the same conditions and by the same steps as the light emitting element 13 to have the same structure. Therefore, the monitoring light emitting element 66 and the light emitting element 13 have the same or approximately the same characteristics with respect to changes in ambient temperature and degradation with time. Such a monitoring light emitting element 66 is connected to the power supply 18 denoted by a circle. Here, the power supply connected to the light emitting element 13 and the power supply connected to the monitoring light emitting element 66 have the same potential; therefore, they are denoted by the same reference numeral 18. Note that although a P-channel transistor is used as the monitor controlling transistor 111 in this embodiment mode, the invention is not limited to this and an N-channel transistor may be used as well. In that case, the peripheral circuit configuration is changed appropriately.

The position of the monitor circuit 64 is not limited, and it may be provided between the signal line driver circuit 43 and the pixel portion 40, or between the first or second scan line driver circuit 41 or 42 and the pixel portion 40.

A buffer amplifier circuit 110 is provided between the monitor circuit 64 and the pixel portion 40. The buffer amplifier circuit 110 has two input terminals one of which is connected to an output terminal; therefore, the input potential is equal to the output potential. The buffer amplifier circuit also has characteristics of high input impedance and high output current capacitance. Accordingly, the circuit configuration can be appropriately determined as long as it has such characteristics.

In such a structure, the buffer amplifier circuit 110 has a function of varying a voltage applied to the light emitting element 13 included in the pixel portion 40 in accordance with a change in potential of one electrode of the monitoring light emitting element 66.

In such a structure, the constant current source 105 and the buffer amplifier circuit 110 may be provided on the same insulating substrate 20 or different substrates.

In the aforementioned structure, a constant current is supplied from the constant current source 105 to the monitoring light emitting element 66. When changes in ambient temperature or degradation with time occurs in this state, the resistance value of the monitoring light emitting element 66 changes. For example, when degradation with time occurs, the resistance value of the monitoring light emitting element 66 increases. Then, the potential difference between both ends of the monitoring light emitting element 66 changes since the current value supplied to the monitoring light emitting element 66 is constant. Specifically, the potential difference between both electrodes of the monitoring light emitting element 66 changes. At this time, the potential of an electrode connected to the power supply 18 is fixed; therefore, the potential of an electrode connected to the constant current source 105 changes. This change in potential of the electrode is supplied to the buffer amplifier circuit 110 through the monitor line 113.

That is to say, the aforementioned change in potential of the electrode is inputted to the input terminal of the buffer amplifier circuit 110. Further, the potential outputted from the output terminal of the buffer amplifier circuit 110 is supplied to the light emitting element 13 through the driving transistor 12. Specifically, the output potential is supplied as the potential of one electrode of the light emitting element 13.

In this manner, changes in the monitoring light emitting element 66 in accordance with changes in ambient temperature and degradation with time are fed back to the light emitting element 13. As a result, the light emitting element 13 can emit light at a luminance corresponding to changes in ambient temperature and degradation with time. Thus, it is possible to provide a light emitting device capable of displaying images regardless of changes in ambient temperature and degradation with time.

In addition, since the plurality of monitoring light emitting elements 66 are provided, changes in potentials thereof can be averaged to be supplied to the light emitting element 13. That is to say, in the invention, it is preferable to provide the plurality of monitoring light emitting elements 66 since the changes in potentials thereof can be averaged.

Further, the plurality of monitoring light emitting elements 66 allow a substitute for a monitoring light emitting element that is short-circuited or the like to be prepared.

According to the invention, the monitor controlling transistor 111 and the inverter 112 that are connected to the monitoring light emitting element 66 may be additionally provided. They are provided in view of operational defects of the monitor circuit 64, which are caused by defects (including initial defect and degradation with time) of the monitoring light emitting element 66. For example, considered is the case where if the constant current source 105 is connected to the monitor controlling transistor 111 without using other transistors and the like, an anode and a cathode of one of the plurality of monitoring light emitting elements 66 are short-circuited due to defects in manufacturing steps and the like. Then, a large amount of current is supplied from the constant current source 105 to the short-circuited monitoring light emitting element 66 through the monitor line 113. Since the plurality of monitoring light emitting elements 66 are connected in parallel to each other, when a large amount of current is supplied to the short-circuited monitoring light emitting element 66, a predetermined constant current is not supplied to the other monitoring light emitting elements. As a result, appropriate changes in potential of the monitoring light emitting element 66 cannot be supplied to the light emitting element 13.

Such a short circuit of the monitoring light emitting element occurs when the potential of the anode of the monitoring light emitting element is equal to or substantially equal to the potential of the cathode thereof. For example, a short circuit occurs in a manufacturing step of the light emitting element due to dusts and the like between the anode and the cathode. The monitoring light emitting element may be short-circuited due to a short circuit between a scan line and the anode as well as due to a short circuit between the anode and the cathode.

In view of the foregoing, the monitor controlling transistor 111 and the inverter 112 are provided in the invention. The monitor controlling transistor 111 has a function of stopping current supply to the short-circuited monitoring light emitting element 66, namely, a function of interrupting the electrical connection between the short-circuited monitoring light emitting element and the monitor line, thereby preventing a large amount of current from being supplied due to the short circuit of the monitoring light emitting element 66, and the like.

The inverter 112 has a function of outputting a potential for turning the monitor controlling transistor off when any one of the plurality of monitoring light emitting elements 66 is short-circuited. The inverter 112 also has a function of outputting a potential for turning the monitor controlling transistor on when none of the monitoring light emitting elements are short-circuited.

Figure 5A:
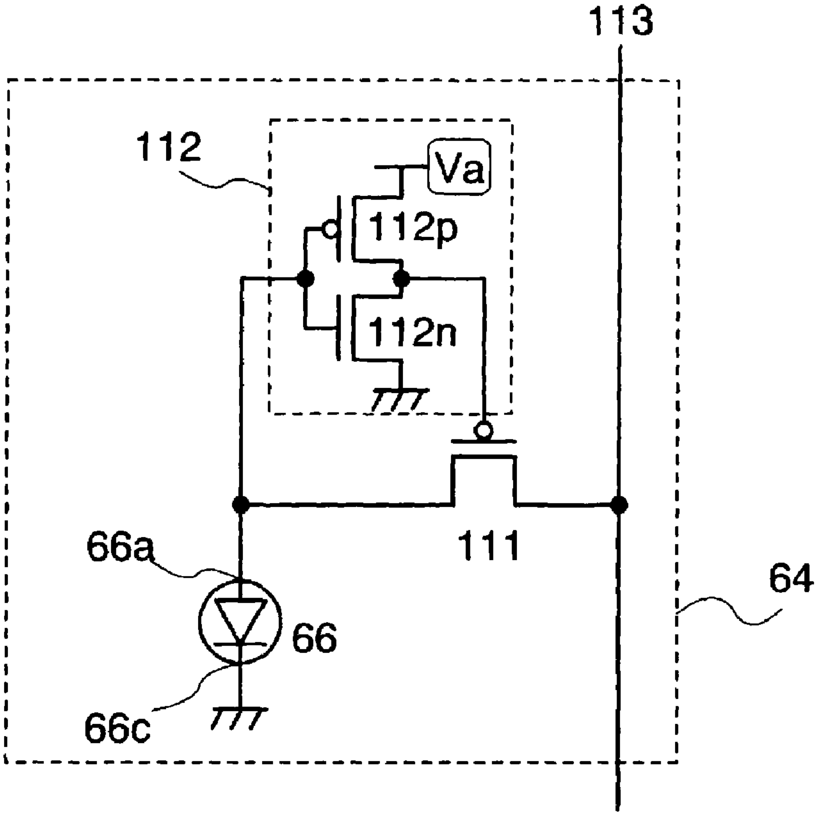
FIGS. 5A and 5B each show a monitor circuit of the invention.
Figure 5B:
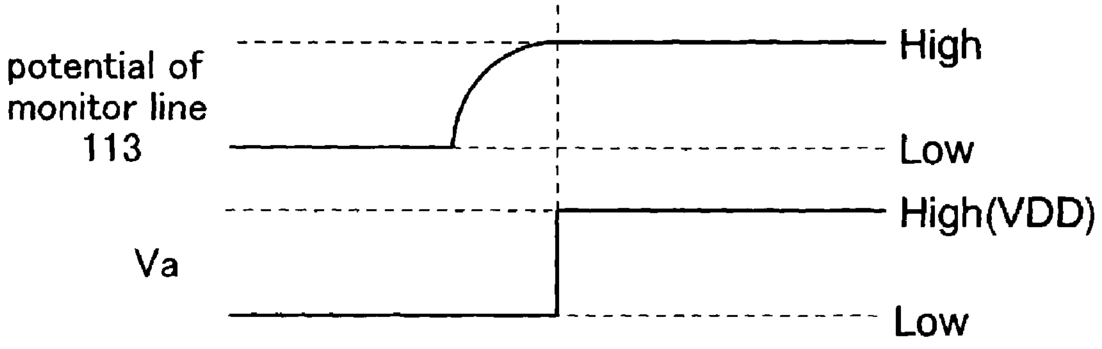

The operation of the monitor circuit 64 is specifically described with reference to FIGS. 5A and 5B. As shown in FIG. 5A, if a cathode electrode 66*c* of the monitoring light emitting element 66 has a lower potential than an anode electrode 66*a* thereof, the anode electrode 66*a* is connected to the input terminals of the inverter 112 while the cathode electrode 66*c* is connected to the power supply 18 to have a fixed potential. Accordingly, when the anode and the cathode of the monitoring light emitting element 66 are short-circuited, the potential of the anode electrode 66*a* becomes close to the potential of the cathode electrode 66*c*. As a result, a Low potential that is close to the potential of the cathode electrode 66*c* is supplied to the inverter 112; therefore, a P-channel transistor 112*p* of the inverter 112 is turned on. Then, a high level potential (Va) of the P-channel transistor 112*p* is outputted from the inverter 112 to be equal to a gate potential of the monitor controlling transistor 111. That is to say, Va is inputted to the gate of the monitor controlling transistor 111, and the monitor controlling transistor 111 is turned off.

Note that VDD that is a higher side potential of Va (High potential) is set to be equal to or higher than the potential of the anode electrode of the light emitting element (anode potential). A lower side potential of an N-channel transistor 112*n*, a Low potential of the monitor line 113, and a Low potential of Va can all be equal to each other. In general, the lower side potential of the N-channel transistor 112*n* is equal to the ground potential; however, the invention is not limited to this and the lower potential of the N-channel transistor 112*n* may be determined so as to have a predetermined potential difference from a High potential. The predetermined potential difference may be determined by current, voltage, and luminance characteristics of a light emitting material, or specifications of a device.

It is necessary here to pay attention to the order of supplying a constant current to the monitoring light emitting element 66. A constant current is required to start flowing to the monitor line 113 when the monitor controlling transistor 111 is on. In this embodiment mode, as shown in FIG. 5B, a current starts flowing to the monitor line 113 while keeping Va at Low. After the potential of the monitor line 113 becomes sufficiently high, Va becomes VDD. As a result, the monitor line 113 can be charged even when the monitor controlling transistor 111 is on.

On the other hand, when the monitoring light emitting element 66 is not short-circuited, the potential of the anode electrode 66*a* is supplied to the inverter 112, and thus the N-channel transistor 112*n* is turned on. Then, a potential high enough to turn the transistor 111 on or a lower side potential that is equal to the ground potential is outputted from the inverter 112, thereby the monitor controlling transistor 111 is turned on.

In this manner, current supply from the constant current source 105 to the short-circuited monitoring light emitting element 66 can be prevented. Thus, if a plurality of monitoring light emitting elements are provided, even when one of the monitoring light emitting elements is short-circuited, current supply to the short-circuited monitoring light emitting element can be interrupted to minimize changes in potential of the monitor line 113. As a result, appropriate changes in potential of the monitoring light emitting element 66 can be supplied to the light emitting element 13.

In this embodiment mode, the constant current source 105 may be a circuit capable of supplying a constant current, and can be formed using, for example, a transistor. For example, a transistor operating in the saturation region may be arranged in each monitor pixel, and a current value flowing to the pixel may be adjusted by controlling a gate electrode of the transistor. Such a case is described below.

Figure 20:
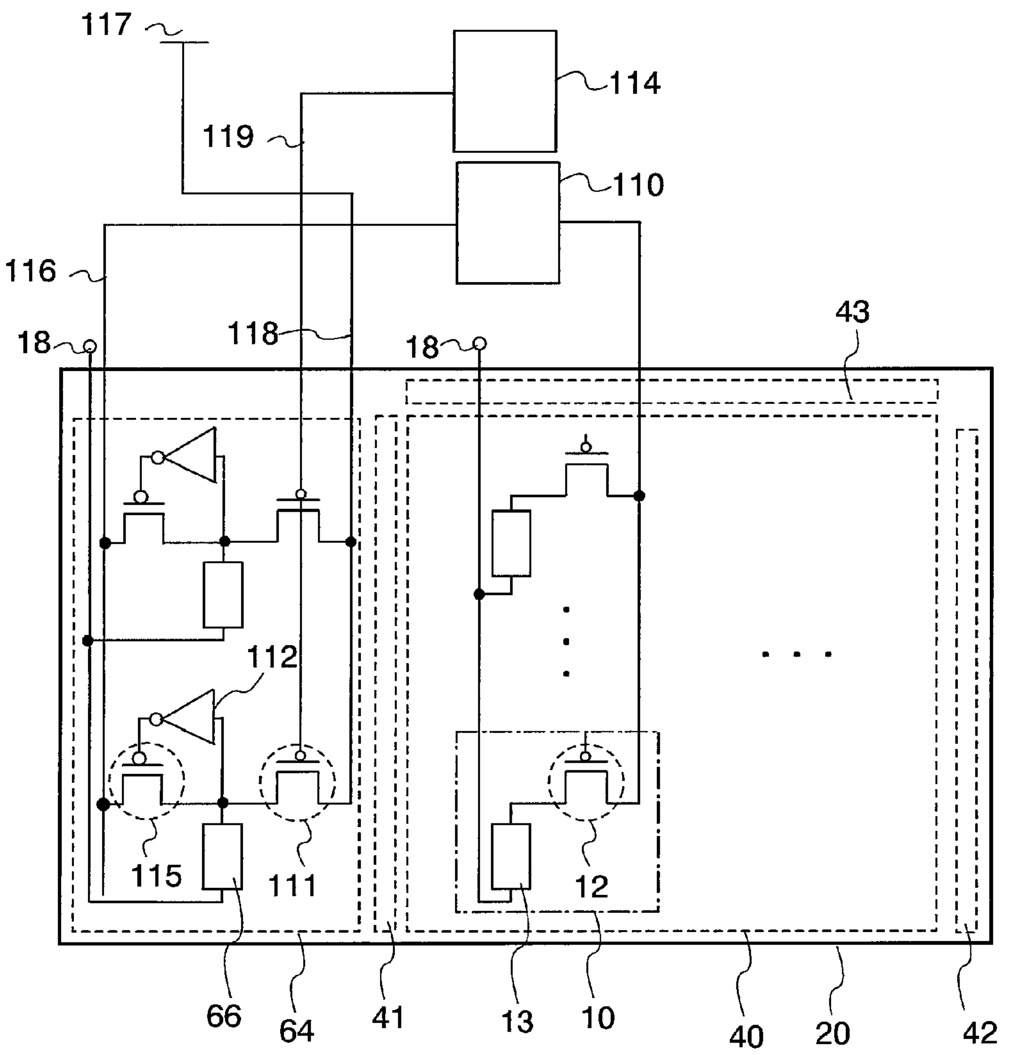
FIG. 20 shows a light emitting device of the invention.

FIG. 20 shows the pixel portion 40, the signal line driver circuit 43, the first scan line driver circuit 41, the second scan line driver circuit 42, and the monitor circuit 64, which are provided on the insulating substrate 20.

The pixel portion 40 includes the plurality of pixels 10 each of which has the light emitting element 13 and the transistor (hereinafter referred to as the driving transistor) 12 that is connected to the light emitting element 13 and has a function of controlling current supply. The light emitting element 13 is connected to the power supply 18 denoted by a circle. A structure of the pixel 10 is more specifically described in the following embodiment mode.

The monitor circuit 64 includes the monitoring light emitting element 66, the transistor (hereinafter referred to as the monitor controlling transistor) 111 connected to the monitoring light emitting element 66, a transistor (hereinafter referred to as a redundant transistor) 115 connected to the monitoring light emitting element 66, and the inverter 112 having the output terminal connected to a gate electrode of the redundant transistor and the input terminal connected to one electrode of the monitor controlling transistor and the monitoring light emitting element. The redundant transistor 115 is connected to the buffer amplifier circuit 110 through a sampling line 116. The monitor controlling transistor 111 is connected to a power supply 117 through a power supply line 118. The gate electrode of the monitor controlling transistor 111 is connected to a voltage output circuit 114 through a control line 119. The monitor controlling transistor 111 has a function of controlling voltage supply from the power supply line 118 to each of the plurality of monitoring light emitting elements 66. The power supply line 118 is connected to electrodes of the plurality of monitoring light emitting elements 66, and thus can monitor changes in potential of the electrodes. The power supply 117 is only required to have a function of supplying a constant voltage to the power supply line 118.

The monitoring light emitting element 66 is formed under the same conditions and by the same steps as the light emitting element 13 to have the same structure. Therefore, the monitoring light emitting element 66 and the light emitting element 13 have the same or approximately the same characteristics with respect to changes in ambient temperature and degradation with time. Such a monitoring light emitting element 66 is connected to the power supply 18. Here, the power supply connected to the light emitting element 13 and the power supply connected to the monitoring light emitting element 66 have the same potential; therefore, they are denoted by the same reference numeral 18. Note that a P-channel transistor is used as the monitor controlling transistor 111 in this embodiment mode, the invention is not limited to this and an N-channel transistor may be used as well. In that case, the peripheral circuit configuration is changed appropriately.

The position of the monitor circuit 64 is not limited, and it may be provided between the signal line driver circuit 43 and the pixel portion 40, or between the first or second scan line driver circuit 41 or 42 and the pixel portion 40.

The buffer amplifier circuit 110 is provided between the monitor circuit 64 and the pixel portion 40. An input potential of the buffer amplifier circuit is equal to an output potential thereof, and the buffer amplifier circuit has characteristics of high input impedance and high output current capacitance. Accordingly, the circuit configuration can be appropriately determined as long as it has such characteristics.

The voltage output circuit 114 is a circuit that outputs an arbitrary potential depending on an input, and the circuit configuration is not specifically limited. For example, a digital-analog converter circuit or the like may be used, which determines an output potential by inputting a video signal or the like.

In such a structure, the buffer amplifier circuit 110 has a function of varying a voltage applied to the light emitting element 13 included in the pixel portion 40 in accordance with a change in potential of one electrode of the monitoring light emitting element 66.

In such a structure, the buffer amplifier circuit 110 and the voltage output circuit 114 may be provided on the same insulating substrate 20 or different substrates.

In the aforementioned structure, a constant voltage is supplied from the power supply 117 to the monitoring light emitting element 66. Then, a constant current is supplied from the monitor controlling transistor 111 operating in the saturation region to the monitoring light emitting element 66. When changes in ambient temperature or degradation with time occurs in this state, the resistance value of the monitoring light emitting element 66 changes. For example, when degradation with time occurs, the resistance value of the monitoring light emitting element 66 increases. Then, the potential difference of the monitoring light emitting element 66 changes since the current value supplied to the monitoring light emitting element 66 is constant. Specifically, the potential difference between both electrodes of the monitoring light emitting element 66 changes. At this time, the potential of an electrode connected to the power supply 18 denoted by a circle is fixed; therefore, the potential of an electrode connected to the monitor controlling transistor 111 changes. This change in potential of the electrode is supplied to the buffer amplifier circuit 110 through the redundant transistor 115 and the sampling line 116.

That is to say, the aforementioned change in potential of the electrode is inputted to the input terminal of the buffer amplifier circuit 110. Further, the potential outputted from the output terminal of the buffer amplifier circuit 110 is supplied to the light emitting element 13 through the driving transistor 12. Specifically, the output potential is supplied as the potential of one electrode of the light emitting element 13.

In this manner, changes in the monitoring light emitting element 66 in accordance with changes in ambient temperature and degradation with time are fed back to the light emitting element 13. As a result, the light emitting element 13 can emit light at a luminance corresponding to changes in ambient temperature and degradation with time. Thus, it is possible to provide a light emitting device capable of displaying images regardless of changes in ambient temperature and degradation with time.

In addition, since the plurality of monitoring light emitting elements 66 are provided, changes in potentials thereof can be averaged to be supplied to the light emitting element 13. That is to say, in the invention, it is preferable to provide the plurality of monitoring light emitting elements 66 since the changes in potentials thereof can be averaged.

Further, the plurality of monitoring light emitting elements 66 allow a substitute for a monitoring light emitting element that is short-circuited or the like to be prepared.

According to the invention, the redundant transistor 115 and the inverter 112 are provided. The redundant transistor has a function of stopping the sampling from a short-circuited monitoring light emitting element 66, namely, a function of interrupting the electrical connection between the short-circuited monitoring light emitting element and the buffer amplifier circuit 110, thereby preventing a large amount of current from being supplied due to the short circuit of the monitoring light emitting element 66, and the like as described above.

The inverter 112 has a function of outputting a potential for turning the redundant transistor 115 off when any one of the plurality of monitoring light emitting elements 66 is short-circuited. The inverter 112 also has a function of outputting a potential for turning the redundant transistor 115 on when none of the monitoring light emitting elements 66 are short-circuited.

Although the monitor circuit 64 has the plurality of monitoring light emitting elements 66, the monitor controlling transistor 111, and the inverter 112 in this embodiment mode, the invention is not limited to this. For example, any circuit may be used as the inverter 112 as long as it has a function of detecting a short-circuited monitoring light emitting element and interrupting current supply to the short-circuited monitoring light emitting element through the monitor line 113. Specifically, the inverter 112 is only required to have a function of turning a monitor controlling transistor off to interrupt current supply to a short-circuited monitoring light emitting element.

This embodiment mode is characterized by using the plurality of monitoring light emitting elements 66, and is preferable since monitoring operation can be performed even when any one of the monitoring light emitting elements 66 is defective. Further, this embodiment mode is preferable since the monitoring operation of the plurality of monitoring light emitting elements 66 can be averaged.

In this embodiment mode, the buffer amplifier circuit 110 is provided to prevent changes in potential. Accordingly, another circuit may be used instead of the buffer amplifier circuit 110 as long as it can prevent changes in potential. That is to say, when the potential of one electrode of the monitoring light emitting element 66 is transferred to the light emitting element 13, a circuit for preventing changes in potential is provided between the monitoring light emitting element 66 and the light emitting element 13. Such a circuit is not limited to the aforementioned buffer amplifier circuit 110 and a circuit with any configuration may be used.

Embodiment Mode 2

Described in this embodiment mode are configuration and operation of a circuit for turning a monitor controlling transistor off when a monitoring light emitting element is short-circuited, which is different from the circuit described in the aforementioned embodiment mode.

Figure 6A:
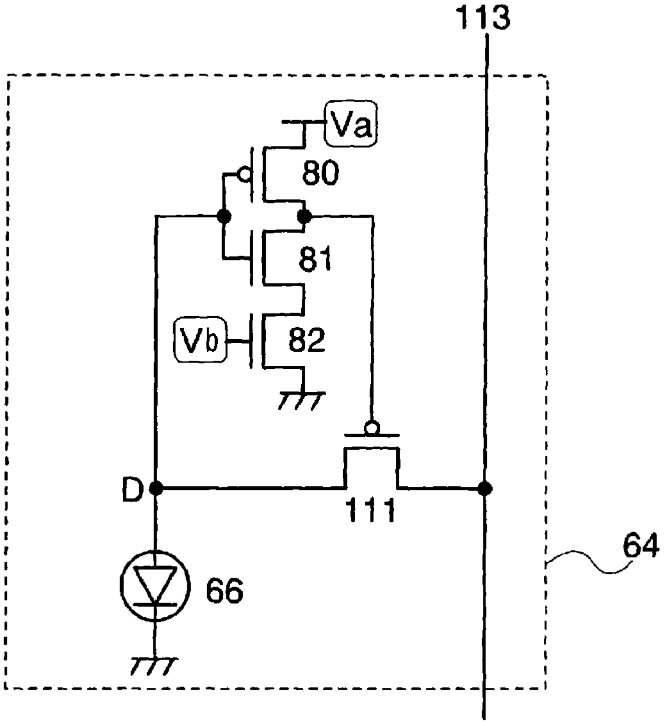
FIGS. 6A and 6B each show a monitor circuit of the invention.

The monitor circuit 64 shown in FIG. 6A includes a first P-channel transistor 80, a second N-channel transistor 81 that has a gate electrode in common with the first transistor and is connected in parallel to the first transistor, and a third N-channel transistor 82 that is connected in series to the second transistor. The monitoring light emitting element 66 is connected to the gate electrode of the first and second transistors 80 and 81. The gate electrode of the monitor controlling transistor 111 is connected to an electrode at which the first and second transistors 80 and 81 are connected to each other. Other configurations are similar to those of the monitor circuit 64 shown in FIGS. 5A and 5B.

It is assumed that a higher side potential of the first P-channel transistor 80 is Va and the potential of a gate electrode of the third N-channel transistor 82 is Vb. Then, the potential of the monitor line 113, the potential Va, and the potential Vb are operated in the manner shown in FIG. 6B.

First, the potential of the monitor line 113 is made sufficiently high, and then the potential Va is set to be High. If the monitoring light emitting element 66 is short-circuited, the potential of the anode of the monitoring light emitting element 66, namely the potential at a point D falls to a potential substantially equal to that of the cathode of the monitoring light emitting element 66. Thus, a Low potential is inputted to the gate electrode of the first and second transistors 80 and 81, and the second N-channel transistor 81 is turned off while the first P-channel transistor 80 is turned on. Then, a higher side potential that is the potential of one electrode of the first transistor 80 is inputted to the gate electrode of the monitor controlling transistor 111, and the monitor controlling transistor 111 is turned off. As a result, no current is supplied from the monitor line 113 to the short-circuited monitoring light emitting element 66.

Figure 6B:
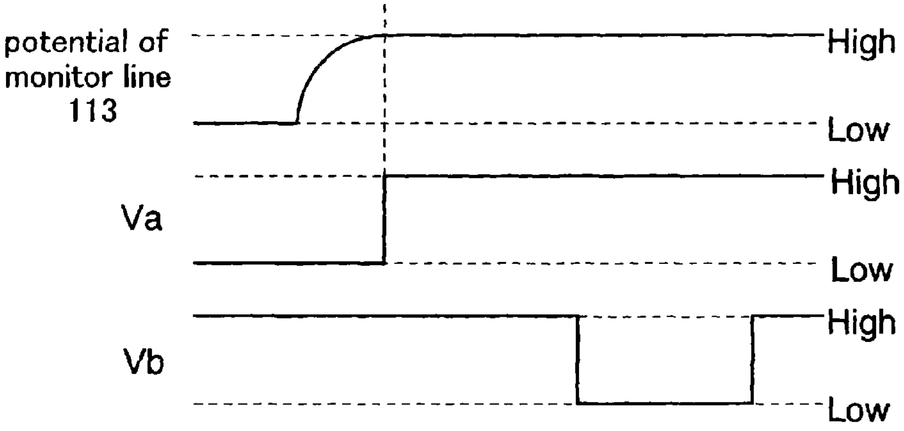

At this time, when the potential of the anode is only slightly reduced because of a small short circuit, it may be difficult to control either of the first and second transistors 80 and 81 is turned on or off. Thus, as shown in FIGS. 6A and 6B, the potential Vb is supplied to the gate electrode of the third transistor 82. That is to say, as shown in FIG. 6B, the potential Vb is set to Low potential while the potential Va is at High. Then, the third N-channel transistor 82 is turned off. As a result, if the potential of the anode is lower than the potential obtained by subtracting a threshold voltage of the first transistor from Va, the first transistor 80 can be turned on while the monitor controlling transistor 111 can be turned off.

By thus controlling the potential Vb, the monitor controlling transistor 111 can be certainly turned off even when the potential of the anode is only slightly reduced.

When the monitoring light emitting element operates normally, the monitor controlling transistor 111 is controlled to be turned on. In other words, since the potential of the anode is substantially equal to a High potential of the monitor line 113, the second transistor 81 is turned on. As a result, a Low potential is applied to the gate electrode of the monitor controlling transistor 111, so that the monitor controlling transistor 111 is turned on.

Figure 7A:
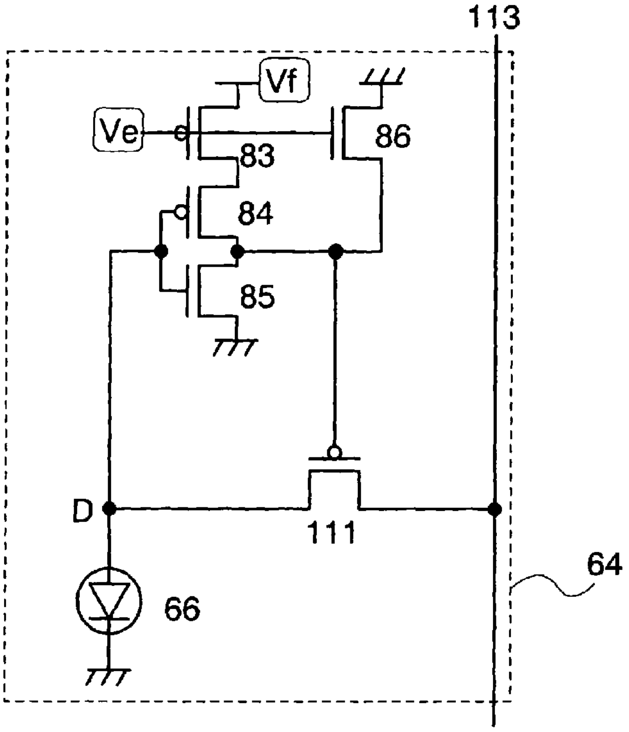
FIGS. 7A and 7B each show a monitor circuit of the invention.
Figure 7B:
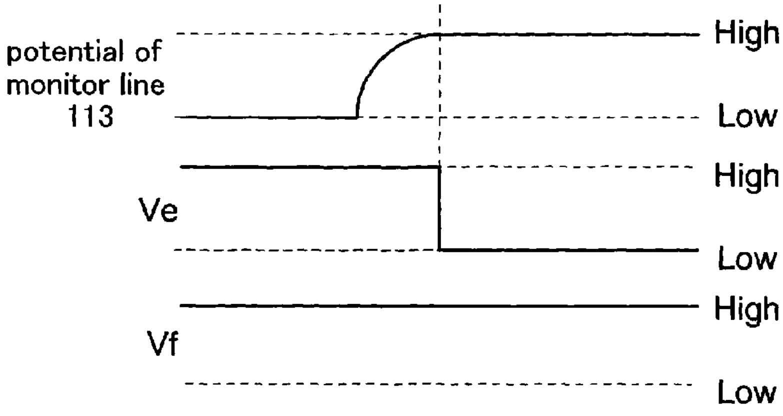

The monitor circuit 64 shown in FIG. 7A includes a first P-channel transistor 83, a second P-channel transistor 84 that is connected in series to the first transistor, a third N-channel transistor 85 that has a gate electrode in common with the second transistor, and a fourth N-channel transistor 86 that has a gate electrode in common with the first transistor and is connected in parallel to the first transistor. The monitoring light emitting element 66 is connected to the gate electrode of the second and third transistors 84 and 85. The gate electrode of the monitor controlling transistor 111 is connected to an electrode at which the second and third transistors 84 and 85 are connected to each other. Further, the gate electrode of the monitor controlling transistor 111 is connected to one electrode of the fourth transistor 86. Other configurations are similar to those of the monitor circuit 64 shown in FIGS. 5A and 5B.

First, the potential of the monitor line 113 is made sufficiently high, and then a potential Ve is set to be Low. Then, the potential of the gate electrode of the first transistor 83 becomes equal to the Low potential of the potential Ve. If the monitoring light emitting element 66 is short-circuited, the potential of the anode of the monitoring light emitting element 66, namely the potential at a point D falls to a potential substantially equal to that of the cathode of the monitoring light emitting element 66. Thus, a Low potential is inputted to the gate electrode of the second and third transistors 84 and 85, and the third N-channel transistor 85 is turned off while the second P-channel transistor 84 is turned on. In addition, when the potential Ve is set to be Low, the first transistor 83 is turned on while the fourth transistor 86 is turned off. Then, a higher side potential Vf of the first transistor 83 is inputted to the gate electrode of the monitor controlling transistor 111 through the second transistor 84, and the monitor controlling transistor 111 is turned off. As a result, no current is supplied from the monitor line 113 to the short-circuited monitoring light emitting element 66. Note that the potential Vf is always kept High.

By thus controlling the potential Ve of the gate electrode, the monitor controlling transistor 111 can be certainly turned off.

Embodiment Mode 3

In the invention, a reverse bias voltage can be applied to a light emitting element and a monitoring light emitting element. Described in this embodiment mode is the case where a reverse bias voltage is applied.

If it is assumed that a forward bias voltage is a voltage applied when the light emitting element 13 and the monitoring light emitting element 66 emit light, a reverse bias voltage means a voltage obtained by inverting a High potential and a Low potential of the forward bias voltage. When specifically described using the monitoring light emitting element 66, a potential lower than that of the power supply 18 is applied to the monitor line 113 so that the potentials of the anode electrode 66*a* and the cathode electrode 66*c* are inverted.

Figure 16:
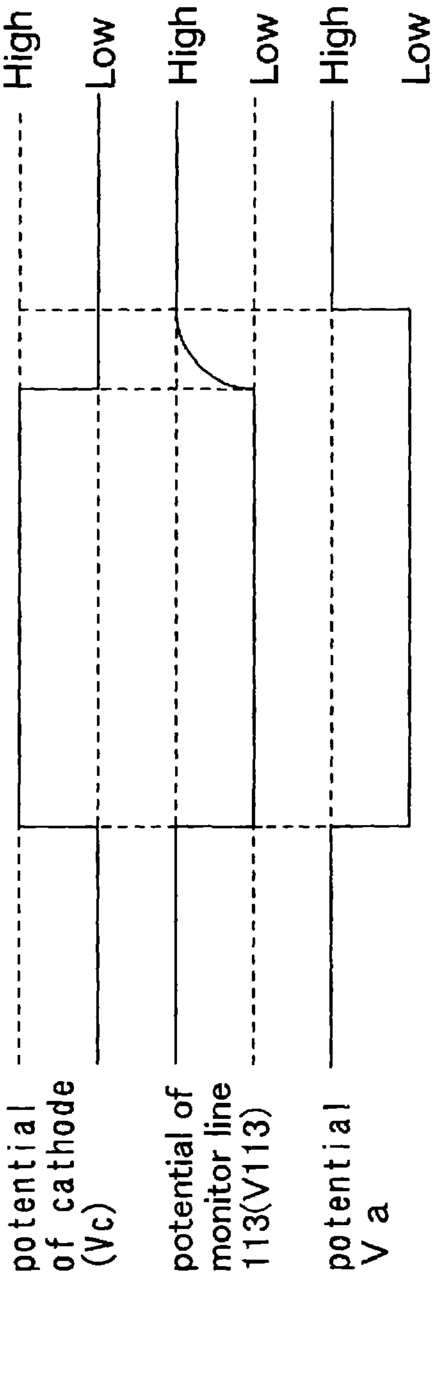
FIG. 16 shows a timing chart of the invention.

Specifically, as shown in FIG. 16, the potential of the anode electrode 66*a* (anode potential: Va) and the potential of the cathode electrode 66*c* (cathode potential: Vc) are inverted. At this time, the potential (Vi13) of the monitor line 113 is inverted. This period when the anode potential and the cathode potential are inverted is referred to as a reverse bias voltage applying period. After a predetermined reverse bias voltage applying period, the cathode potential is restored and a constant current is supplied to the monitor line 113. After the charge of the monitor line 113 is completed, that is, the voltage of the monitor line 113 is made sufficiently high, the potential of the monitor line is restored. At this time, the potential of the monitor line 113 is restored in a curved line, and this is because a plurality of monitoring light emitting elements are charged with a constant current and further parasitic capacitance is also charged.

Preferably, the anode potential is inverted and then the cathode potential is inverted. Then, after a predetermined reverse bias voltage applying period, the anode potential is restored and then the cathode potential is restored. At the same time as the anode potential is inverted, the potential of the monitor line 113 is charged to be High.

In this reverse bias voltage applying period, the driving transistor 12 and the monitor controlling transistor 111 are required to be on.

By applying a reverse bias voltage to the light emitting elements, defects of the light emitting element 13 and the monitoring light emitting element 66 can be improved to increase the reliability thereof. In addition, in the light emitting element 13 and the monitoring light emitting element 66, an initial defect where an anode and a cathode are short-circuited may occur due to the deposition of foreign material, pinholes caused by a slight unevenness of the anode or the cathode, or an electroluminescent layer that is not evenly formed. When such an initial defect occurs, light emission and non-light emission are not carried out in accordance with signals, and thus almost all currents flow in the short-circuited element, leading to faulty display of images. This initial defect may occur in any pixel.

In view of the foregoing, in this embodiment mode, a reverse bias voltage is applied to the light emitting element 13 and the monitoring light emitting element 66, so that a current is locally supplied to a short-circuited portion, and the short-circuited portion generates heat to be oxidized or carbonized. As a result, the short-circuited portion can be insulated and a current flows to regions besides the short-circuited portion, thereby the light emitting element 13 and the monitoring light emitting element 66 can operate normally. In this manner, even when an initial defect occurs, the defect can be solved by applying a reverse bias voltage. Note that such insulation of the short-circuited portion is preferably carried out before shipment.

In addition to the initial defect, an anode and a cathode may be short-circuited as time passes. Such a defect is called a progressive defect. According to the invention, even when a progressive defect occurs, the defect can be solved by regularly applying a reverse bias voltage to the light emitting element 13 and the monitoring light emitting element 66. Thus, the light emitting element 13 and the monitoring light emitting element 66 can operate normally.

In addition, image burn-in can also be prevented by applying a reverse bias voltage. The image burn-in is caused by degradation of the light emitting element 13; however, the degradation can be reduced by applying a reverse bias voltage. As a result, the image burn-in can be prevented.

In general, degradation of the light emitting element 13 and the monitoring light emitting element 66 progresses rapidly in the initial stage and gradually slows down with time. That is to say, in a pixel, the light emitting element 13 and the monitoring light emitting element 66 that have degraded in the initial stage do not degrade easily, leading to variations in the light emitting elements 13. Accordingly, all of the light emitting element 13 and the monitoring light emitting element 66 preferably emit light before shipment, during a period when no image is displayed, or the like, which causes degradation of elements that have not degraded. As a result, the degradation state of all the elements can be averaged. Such a configuration where all the elements emit light may be used in a light emitting device.

Embodiment Mode 4

Described in this embodiment mode are a pixel circuit and a configuration example.

Figure 2:
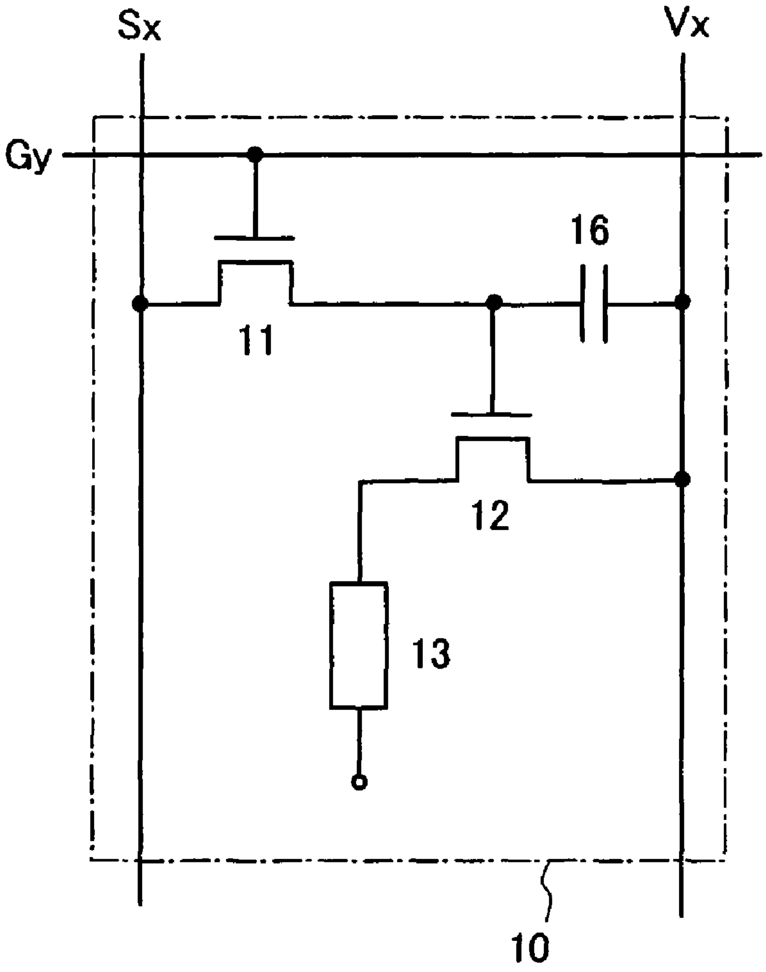
FIG. 2 shows an equivalent circuit of a pixel of the invention.

FIG. 2 shows a pixel circuit capable of being used for a pixel portion of the invention. The pixel portion 40 includes a signal line Sx, a scan line Gy, and a power supply line Vx that are arranged in matrix, and the pixel 10 is provided at an intersection of these lines. The pixel 10 includes a switching transistor 11, the driving transistor 12, a capacitor 16, and the light emitting element 13.

The connection relation of this pixel is described. The switching transistor 11 is provided at an intersection of the signal line Sx and the scan line Gy. One electrode of the switching transistor 11 is connected to the signal line Sx while a gate electrode thereof is connected to the scan line Gy. One electrode of the driving transistor 12 is connected to the power supply line Vx while a gate electrode thereof is connected to the other electrode of the switching transistor 11. The capacitor 16 is provided to hold a gate-source voltage of the driving transistor 12. In this embodiment mode, one electrode of the capacitor 16 is connected to the power supply line Vx while the other electrode thereof is connected to the gate electrode of the driving transistor 12. Note that the capacitor 16 is not necessarily provided when, for example, the driving transistor 12 has large gate capacitance and small leak current. The light emitting element 13 is connected to the other electrode of the driving transistor 12.

A driving method of such a pixel is described.

When the switching transistor 11 is turned on, a video signal is inputted from the signal line Sx. Charges are accumulated in the capacitor 16 in accordance with the video signal. When the gate-source voltage (Vgs) of the driving transistor 12 exceeds a threshold voltage of the driving transistor 12, the driving transistor 12 is turned on. Then, a current is supplied to the light emitting element 13 to emit light. At this time, the driving transistor 12 can operate in either the linear region or the saturation region. If the driving transistor 12 operates in the saturation region, a constant current can be supplied thereto. Meanwhile, if the driving transistor 12 operates in the linear region, it can be driven with a constant voltage, leading to lower power consumption.

The driving method of the pixel is described with reference to timing charts.

Figure 8A:
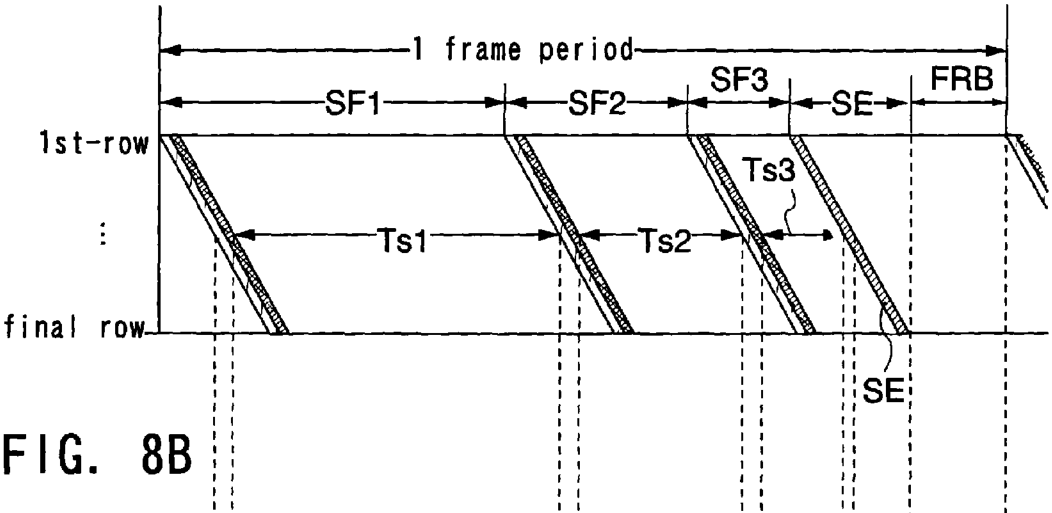
FIGS. 8A and 8B each show a timing chart of the invention.

FIG. 8A shows a timing chart of one frame period in the case of writing an image 60 times per second. In the timing chart, the ordinate represents a scan line G (from the first to the last row) whereas the abscissa represents time.

One frame period includes m (m is a natural number of 2 or more) subframe periods SF1, SF2, . . . , SFm, each of which includes writing periods Ta1, Ta2, . . . , Tam and display periods (lighting periods) Ts1, Ts2, . . . , Tsm respectively. One frame period also includes a reverse bias voltage applying period and a period SE for preparing the reverse bias voltage applying period. In this embodiment mode, as shown in FIG. 8A, one frame period includes subframe periods SF1, SF2 and SF3, the period SE for preparing a reverse bias voltage applying period, and the reverse bias voltage applying period (FRB). In the subframe periods SF1, SF2 and SF3, the writing periods Ta1 to Ta3 are sequentially performed, which are followed by the display periods Ts1 to Ts3 respectively. The length of each display period is not specifically limited as long as gray scales can be expressed. Further, the number of times of writing an image per second is not specifically limited.

The reverse bias voltage applying period (FRB) is not necessarily provided.

A non-light emitting period may be provided in one frame period. One of the effects of this is that more clear images can be displayed when moving images are displayed.

Figure 8B:
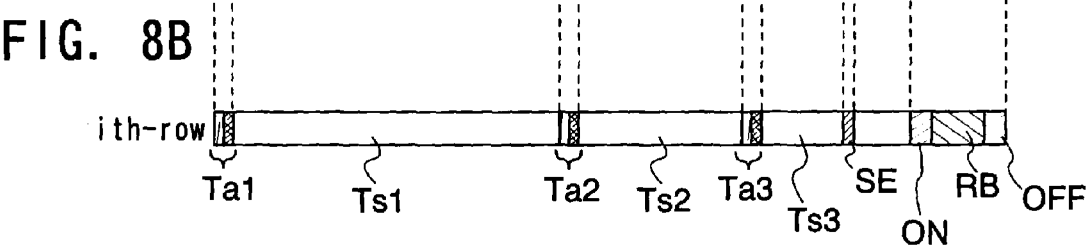

A timing chart of FIG. 8B shows a writing period, a display period and a reverse bias voltage applying period of a certain row (i-th row). A reverse bias voltage applying period RB appears after writing periods Ta1, Ta2 and Ta3 and display periods Ts1, Ts2 and Ts3 alternately appear. A period having the writing periods Ta1, Ta2 and Ta3 and the display periods Ts1, Ts2 and Ts3 is referred to as a forward bias voltage applying period.

The writing period Ta can be divided into a plurality of operating periods. In this embodiment mode, the writing period Ta is divided into two operating periods, during one of which an erasing operation is performed and a writing operation is performed during the other. In order to thus perform an erasing operation and a writing operation, a WE (Write Erase) signal is inputted. Other erasing operations, writing operations, and signals are described more specifically in the following embodiment mode.

Figure 21:
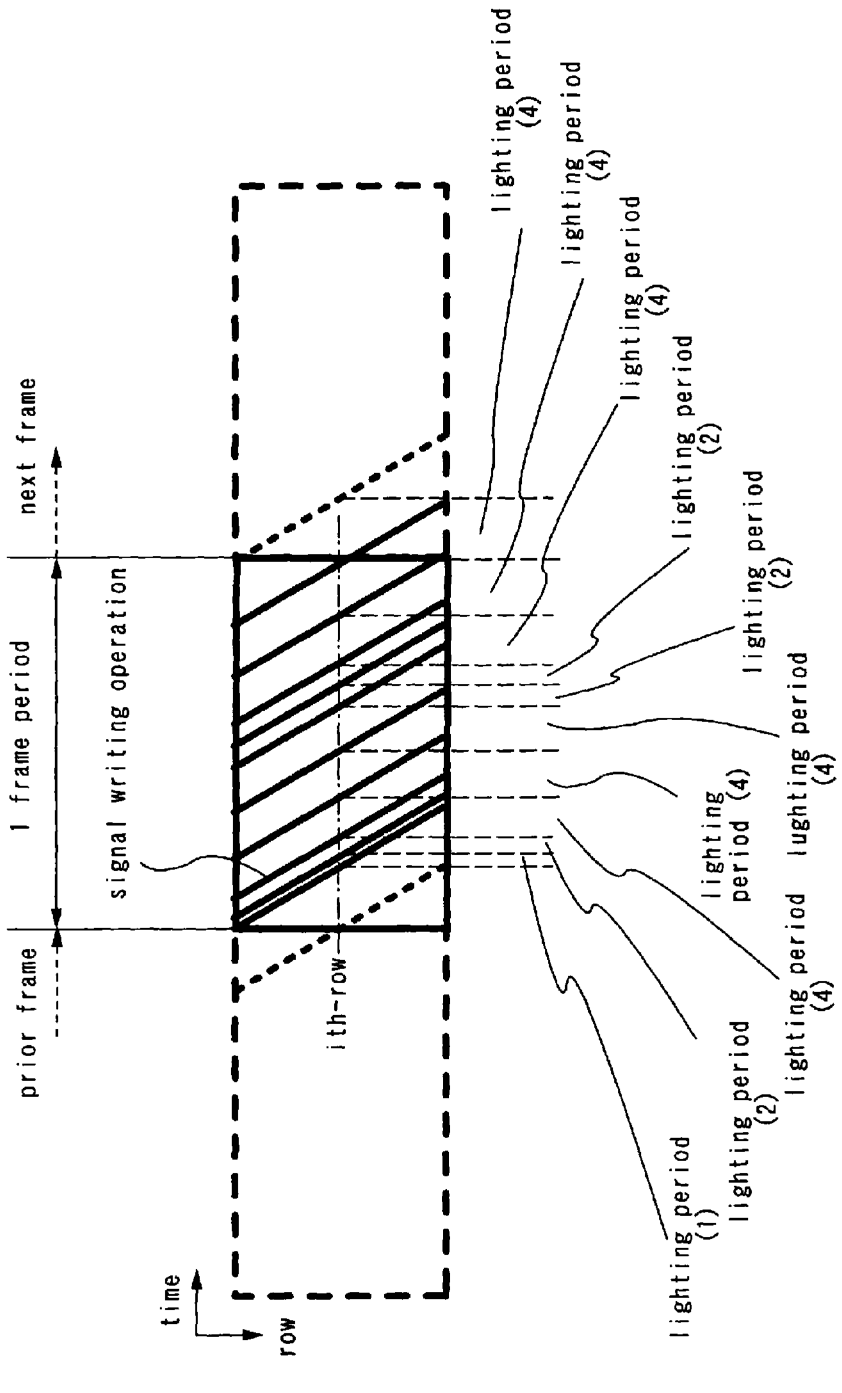
FIG. 21 shows a timing chart of the invention.

FIG. 21 shows a specific example where the writing period Ta in one frame period of the timing chart shown in FIGS. 8A and 8B is divided into four operating periods.

One frame period has eleven subframe periods including ten display periods and one non-light emitting period. In this embodiment mode, as shown in FIG. 21, one frame period has subframe periods one of which is a non-light emitting period. In addition, the length of each display period is not specifically limited as long as gray scales can be expressed. Further, the number of times of writing an image per second is not specifically limited.

The non-light emitting period may be provided in plurality, or is not necessarily provided.

The writing period Ta is not necessarily divided into an erasing period and a writing period, and it may be divided into a plurality of writing periods such that a writing operation is performed in both one period and the other period. In order to thus perform a plurality of writing operations, a WE (Write Erase) signal is inputted. It is needless to say that a decoder circuit may be used. This is also described more specifically in the following embodiment mode.

During a non-light emitting period, a reverse bias voltage is applied. Immediately before the non-light emitting period, a period when switching transistors of all pixels are simultaneously turned on, namely a period when all scan lines are turned on (On period) is provided.

Immediately after a reverse bias voltage applying period, a period when switching transistors of all pixels are simultaneously turned off, namely a period when all scan lines are turned off (Off period) may be provided.

In addition, an erasing period (SE) is provided immediately before the reverse bias voltage applying period. Similar operation to the aforementioned erasing operation is performed during the erasing period. During the erasing period, data that has been written during the subframe period immediately before the erasing period, namely during SF3 in this embodiment mode, is sequentially erased. This is because during the On period, the switching transistors are simultaneously turned on after the display period of the pixels of the last row is completed, and thus each pixel of the first row and the like has an unnecessary display period.

The control for providing such On period, Off period, and erasing period is carried out by driver circuits such as a scan line driver circuit and a signal line driver circuit.

Note that the timing of applying a reverse bias voltage to the light emitting element 13, namely the reverse bias voltage applying period is not limited to those shown in FIGS. 8A and 8B. That is to say, the reverse bias voltage applying period is not necessarily provided for each frame period, nor in the latter part of one frame period. The On period is only required to be provided immediately before the applying period (RB) and the Off period is only required to be provided immediately after the applying period (RB). In addition, the order of inverting the potentials of the anode and the cathode of the light emitting element is not limited to those shown in FIGS. 8A and 8B. That is, the potential of the anode electrode may be decreased after the potential of the cathode electrode is increased.

Figure 3:
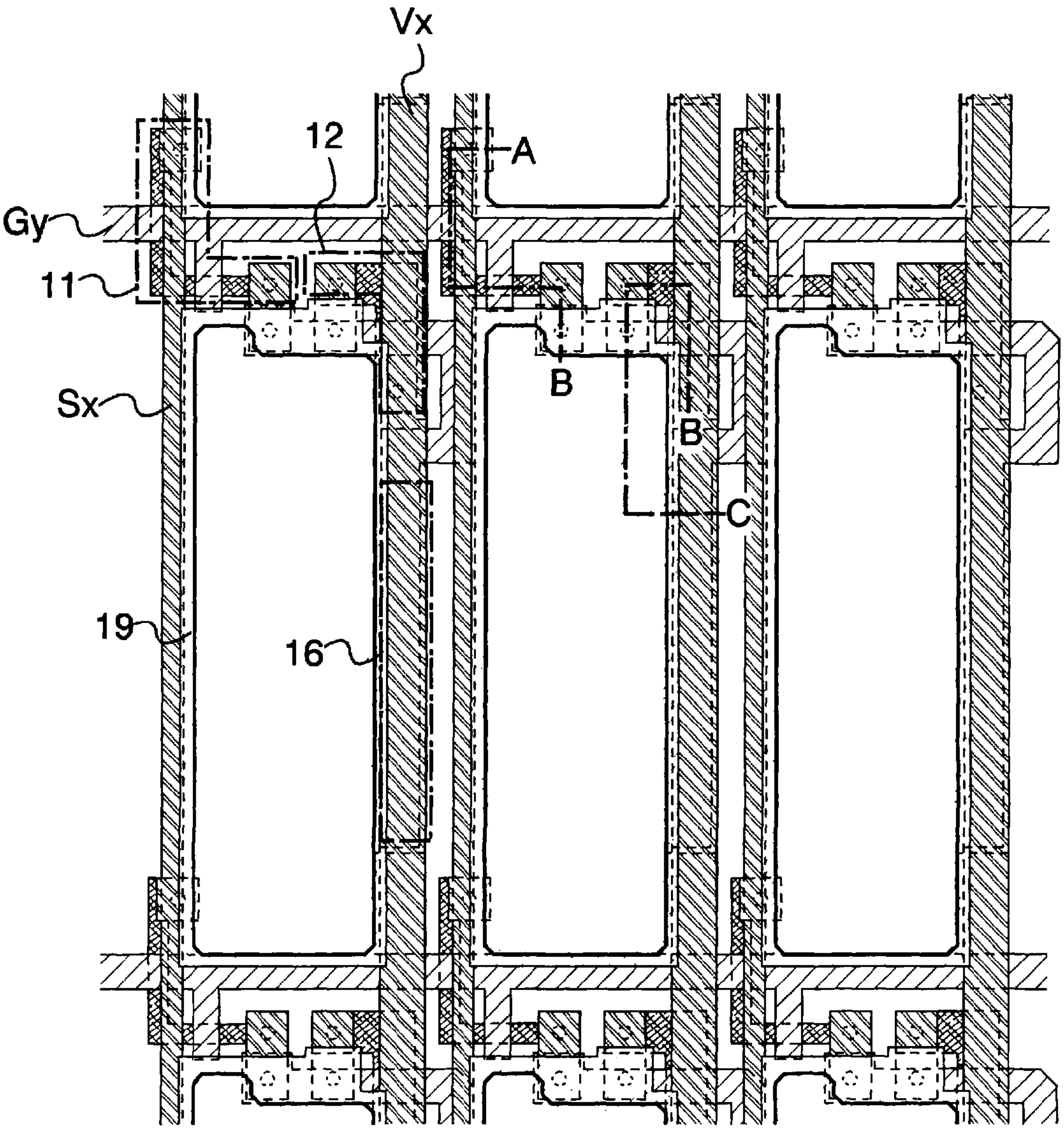
FIG. 3 shows a layout of a pixel of the invention.

FIG. 3 shows a layout example of the pixel circuit shown in FIG. 2. A semiconductor film is formed to constitute the switching transistor 11 and the driving transistor 12. Then, a first conductive film is formed with an insulating film functioning as a gate insulating film interposed therebetween. The conductive film is used as gate electrodes of the switching transistor 11 and the driving transistor 12, and can also be used as the scan line Gy. At this time, the switching transistor 11 preferably has a double gate structure.

Subsequently, a second conductive film is formed with an insulating film functioning as an interlayer insulating film interposed therebetween. The conductive film is used as drain and source wires of the switching transistor 11 and the driving transistor 12, and can also be used as the signal line Sx and the power supply line Vx. At this time, the capacitor 16 can be formed by stacking the first conductive film, the insulating film functioning as an interlayer insulating film, and the second conductive film. The gate electrode of the driving transistor 12 is connected to the other electrode of the switching transistor through a contact hole.

A pixel electrode 19 is formed in an opening provided in the pixel. The pixel electrode is connected to the other electrode of the driving transistor 12. If an insulating film and the like are formed between the second conductive film and the pixel electrode at this time, the pixel electrode is required to be connected to the other electrode of the driving transistor 12 through a contact hole. If an insulating film and the like are not formed, the pixel electrode can be connected directly to the other electrode of the driving transistor 12.

Figure 4:
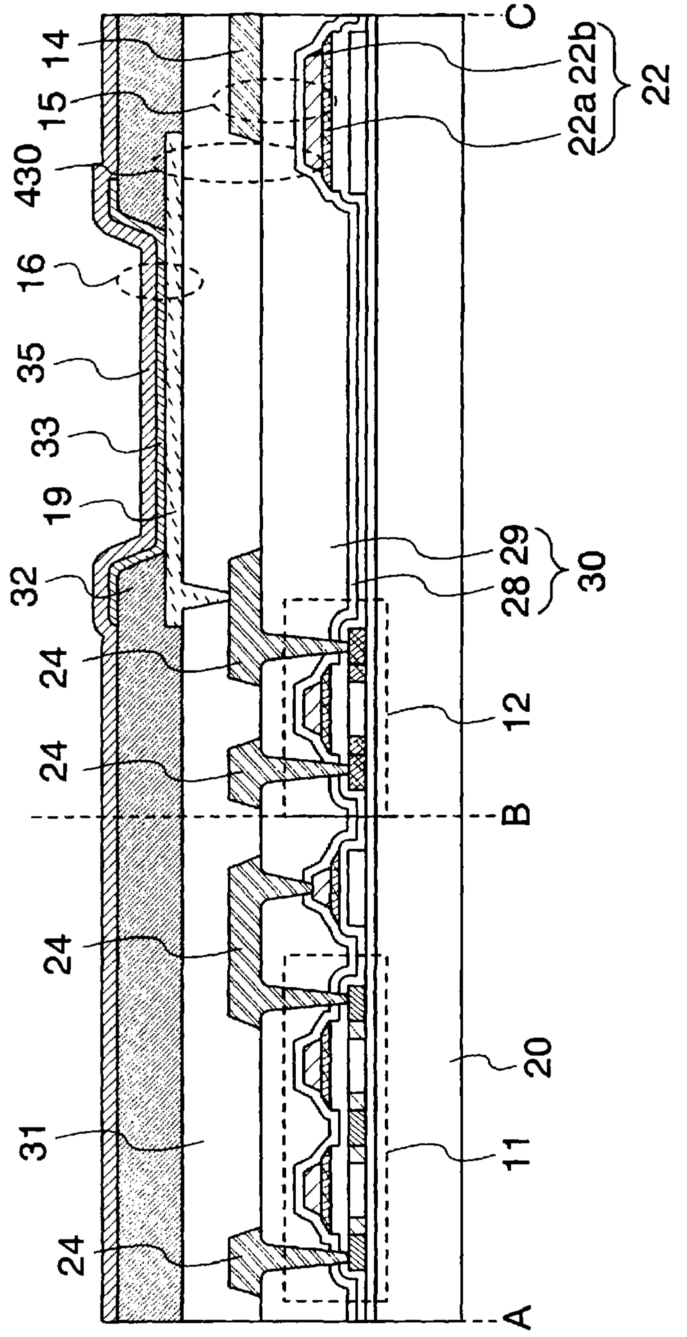
FIG. 4 shows a cross section of a pixel of the invention.

FIG. 4 shows an example of a cross sectional view along lines A-B and B-C shown in FIG. 3.

A semiconductor film that is selectively etched is formed on the insulating substrate 20 with a base film interposed therebetween. The insulating substrate 20 may be, for example, a glass substrate such as barium borosilicate glass and alumino borosilicate glass, a quartz substrate, a stainless (SUS) substrate, or the like. A substrate made of a flexible synthetic resin such as acrylic and plastic typified by PET (polyethylene terephthalate), PEN (polyethylene naphthalate), and PES (polyether sulfone) generally has a lower heat resistance as compared with other substrates, though it may be used if it can be resistant to the processing temperature during manufacturing steps. The base film may be formed using an insulating film such as silicon oxide, silicon nitride, and silicon nitride oxide.

An amorphous semiconductor film is formed on the base film so as to have a thickness of 25 to 100 nm (preferably, 30 to 60 nm). Silicon germanium as well as silicon can be used for the amorphous semiconductor film.

The amorphous semiconductor film is crystallized as needed to form a crystalline semiconductor film. The crystallization may be performed using a furnace, laser irradiation, irradiation of light emitted from a lamp (hereinafter referred to as lamp annealing), or a combination of them. For example, a crystalline semiconductor film is formed by adding a metal element to an amorphous semiconductor film and applying heat treatment using a furnace. A semiconductor film is preferably added with a metal element since it can be crystallized at low temperature.

The thus formed crystalline semiconductor film is etched to have a predetermined shape. The predetermined shape is a shape to be the switching transistor 11 and the driving transistor 12 as shown in FIG. 3.

Then, an insulating film functioning as a gate insulating film is formed. The insulating film is formed to have a thickness of 10 to 150 nm, and preferably 20 to 40 nm, so as to cover the semiconductor film. The insulating film may have a single layer structure or a stacked layer structure using a silicon oxynitride film, a silicon oxide film, and the like.

A first conductive film functioning as a gate electrode is formed on the semiconductor film with a gate insulating film interposed therebetween. The gate electrode may have a single layer structure or a stacked layer structure, though a stacked layer structure of conductive films 22*a* and 22*b* is used in this embodiment mode. Each of the conductive films 22*a* and 22*b* may be formed of an element selected from Ta, W, Ti, Mo, Al, and Cu, or an alloy or compound material mainly containing any of these elements. In this embodiment mode, the conductive film 22*a* is made of a tantalum nitride film with a thickness of 10 to 50 nm, for example 30 nm, and the conductive film 22*b* is stacked thereon using a tungsten film with a thickness of 200 to 400 nm, for example 370 nm.

An impurity element is added with the gate electrode used as a mask. At this time, a low concentration impurity region may be formed in addition to a high concentration impurity region, which is called an LDD (Lightly Doped Drain) structure. In particular, a structure where the low concentration impurity region overlaps the gate electrode is called a GOLD (Gate Overlapped LDD) structure. An N-channel transistor preferably has the low concentration impurity region in particular.

This low concentration impurity region may cause unwanted capacitance. Accordingly, the driving method of the invention is preferably adopted in the case of forming a pixel using a TFT having an LDD structure or a GOLD structure.

Subsequently, insulating films 28 and 29 functioning as an interlayer insulating film 30 are formed. The insulating film 28 may be an insulating film containing nitrogen, and in this embodiment mode, a silicon nitride film with a thickness of 100 nm is formed by plasma CVD. Meanwhile, the insulating film 29 may be formed using an organic material or an inorganic material. The organic material includes polyimide, acrylic, polyamide, polyimide amide, benzocyclobutene, siloxane, and polysilazane. Siloxane is composed of a skeleton formed by the bond of silicon (Si) and oxygen (0), in which an organic group containing at least hydrogen (such as an alkyl group or aromatic hydrocarbon) is included as a substituent. Alternatively, a fluoro group may be used as the substituent. Further alternatively, a fluoro group and an organic group containing at least hydrogen may be used as the substituent. Polysilazane is formed using as a starting material a liquid material containing a polymer material having the bond of silicon (Si) and nitrogen (N). The inorganic material includes an insulating film containing oxygen or nitrogen such as silicon oxide ($SiO_x$), silicon nitride ($SiN_x$), silicon oxynitride ($SiO_xN_y$) (x>y), and silicon nitride oxide ($SiN_xO_y$) (x>y) (x, y=1, 2 . . . ). Alternatively, the insulating film 29 may have a stacked layer structure of these insulating films. In particular, when the insulating film 29 is formed using an organic material, uniformity is improved while moisture and oxygen are absorbed into the organic material. In order to prevent this, an insulating film containing an inorganic material may be formed on the organic material. An insulating film containing nitrogen is preferably used as the inorganic material since alkali ions such as Na can be prevented from entering. An organic material is preferably used for the insulating film 29 since uniformity can be improved.

A contact hole is formed in the interlayer insulating film 30 and the gate insulating film. Then, a second conductive film is formed, which functions as source and drain wires 24 of the switching transistor 11 and the driving transistor 12, the signal line Sx, and the power supply line Vx. The second conductive film may be formed using an element such as aluminum (Al), titanium (Ti), molybdenum (Mo), tungsten (W), and silicon (Si), or an alloy film using such elements. In this embodiment mode, the second conductive film is formed by stacking a titanium (Ti) film, a titanium nitride (TiN) film, an aluminum-titanium alloy (Al—Ti) film, and a titanium (Ti) film, which have a thickness of 60 nm, 40 nm, 300 nm, and 100 nm respectively.

An insulating film 31 is formed so as to cover the second conductive film. The insulating film 31 may be formed using any of the materials of the interlayer insulating film 30 described above. A high aperture ratio can be achieved by providing such an insulating film 31.

The pixel electrode (also referred to as a first electrode) 19 is formed in the opening provided in the insulating film 31. In order to increase the step coverage of the pixel electrode in the opening, the end portion of the opening is preferably roundish so as to have a plurality of radii of curvature. The pixel electrode 19 may be formed using a light transmissive material such as indium tin oxide (ITO), indium zinc oxide (IZO) obtained by mixing 2 to 20% of zinc oxide (ZnO) into indium oxide, ITO-$SiO_x$ obtained by mixing 2 to 20% of silicon oxide ($SiO_2$) into indium oxide, organic indium, and organotin. The pixel electrode 19 may also be formed using a light shielding material such as an element selected from silver (Ag), tantalum, tungsten, titanium, molybdenum, aluminum, and copper, or an alloy or compound material mainly containing any of these elements. When the insulating film 31 is formed of an organic material to improve uniformity at this time, the surface uniformity on which the pixel electrode is formed is improved, which allows a constant voltage to be applied and prevents a short circuit.

There may occur unwanted coupling capacitance in an area 430 where the first conductive film overlaps the pixel electrode. Such unwanted coupling capacitance can be eliminated by the driving method of the invention.

Subsequently, an electroluminescent layer 33 is formed by vapor deposition or ink jet printing. The electroluminescent layer 33 is formed by arbitrarily combining an electron injection layer (EIL), an electron transporting layer (ETL), a light emitting layer (EML), a hole transporting layer (HTL), a hole injection layer (HIL), and the like using an organic material or an inorganic material. Note that the boundaries between each layer are not necessarily clearly defined, and there is also a case where materials of the respective layers are partially mixed with each other, which blurs the boundaries. The structure of the electroluminescent layer 33 is not limited to the aforementioned stacked layer structure.

A second electrode 35 is formed by sputtering or vapor deposition. The first electrode (pixel electrode) 19 and the second electrode 35 of the light emitting element function as an anode or a cathode depending on a pixel configuration.

The anode is preferably formed of a metal, an alloy, a conductive compound, and a mixture thereof, each of which has a high work function (work function of 4.0 eV or higher). More specifically, the anode may be formed of ITO, IZO obtained by mixing 2 to 20% of zinc oxide (ZnO) into indium oxide, gold (Au), platinum (Pt), nickel (Ni), tungsten (W), chromium (Cr), molybdenum (Mo), iron (Fe), cobalt (Co), copper (Cu), palladium (Pd), nitride of a metal material (TiN), or the like.

On the other hand, the cathode is preferably formed of a metal, an alloy, a conductive compound, and a mixture thereof, each of which has a low work function (work function of 3.8 eV or lower). More specifically, the cathode may be formed of an element belonging to Group 1 or Group 2 of the periodic table, namely an alkaline metal such as Li and Cs, an alkaline earth metal such as Mg, Ca and Sr, an alloy (Mg:Ag, Al:Li) or a compound (LiF, CsF, $CaF_2$) containing them, and a transition metal including a rare earth metal. Since the cathode is required to transmit light, these metals or alloys containing them are formed extremely thin and stacked with a metal (including an alloy) such as ITO.

A protective film may be formed thereafter so as to cover the second electrode 35. As the protective film, a silicon nitride film or a DLC film may be used.

In this manner, the pixel of the light emitting device can be completed.

Embodiment Mode 5

Described in this embodiment mode is a structure of the whole light emitting device having a pixel circuit in the case where the writing period Ta described in the above embodiment mode is divided into two operating periods, during one of which an erasing operation is performed and a writing operation is performed during the other.

Figure 12:
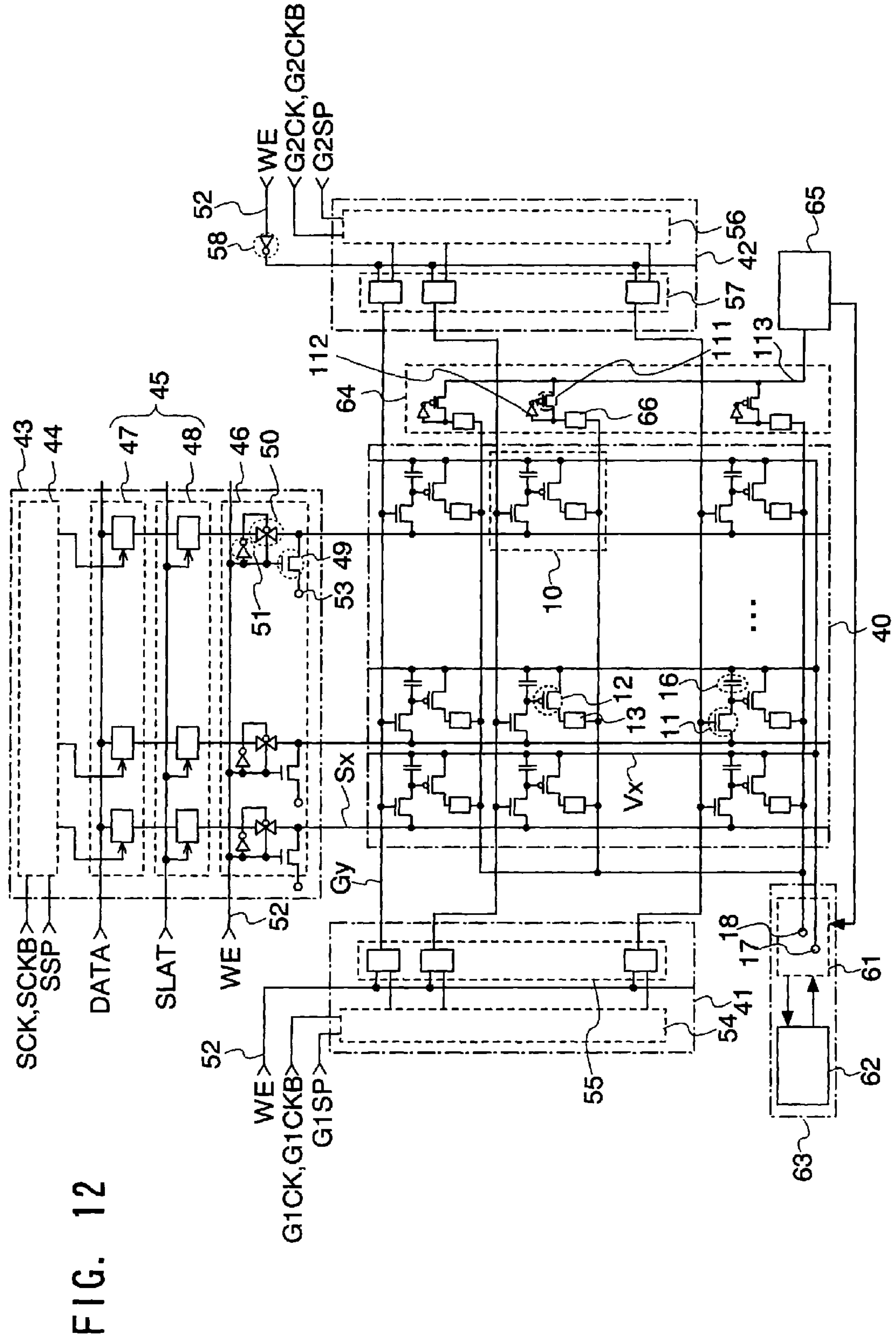
FIG. 12 shows a light emitting device of the invention.

As shown in FIG. 12, a light emitting device of the invention includes the pixel portion 40 where the aforementioned plurality of pixels 10 are arranged in matrix, the first scan line driver circuit 41, the second scan line driver circuit 42, and the signal line driver circuit 43. The first scan line driver circuit 41 and the second scan line driver circuit 42 may be arranged so as to face each other with the pixel portion 40 interposed therebetween, or may be arranged on one of the four sides of the pixel portion 40.

The signal line driver circuit 43 includes a pulse output circuit 44, a latch 45, and a selection circuit 46. The latch 45 has a first latch 47 and a second latch 48. The selection circuit 46 has a transistor (hereinafter referred to as a TFT 49) and an analog switch 50 as switching means. The TFT 49 and the analog switch 50 are provided in each column corresponding to a signal line. In addition, in this embodiment mode, an inverter 51 is provided in each column for generating an inverted signal of a WE signal. Note that the inverter 51 is not necessarily provided when an inverted signal of a WE signal is supplied externally.

A gate electrode of the TFT 49 is connected to a selection signal line 52, and one electrode thereof is connected to a signal line while the other electrode is connected to a power supply 53. The analog switch 50 is provided between the second latch 48 and each signal line. In other words, an input terminal of the analog switch 50 is connected to the second latch 48 while an output terminal thereof is connected to the signal line. One of two control terminals of the analog switch 50 is connected to the selection signal line 52 while the other is connected to the selection signal line 52 through the inverter 51. The power supply 53 has a potential that turns off the driving transistor 12 in each pixel, and the potential of the power supply 53 is Low if an N-channel transistor is used as the driving transistor 12 and is High if a P-channel transistor is used as the driving transistor 12.

The first scan line driver circuit 41 includes a pulse output circuit 54 and a selection circuit 55. The second scan line driver circuit 42 includes a pulse output circuit 56 and a selection circuit 57. Start pulses (G1SP, G2SP) are inputted to the pulse output circuits 54 and 56 respectively. Clock pulses (G1LCK, G2CK) and inverted clock pulses thereof (G1CKB, G2CKB) are also inputted to the pulse output circuits 54 and 56 respectively.

The selection circuits 55 and 57 are connected to the selection signal line 52, though the selection circuit 57 included in the second scan line driver circuit 42 is connected to the selection signal line 52 through an inverter 58. That is to say, WE signals inputted to the selection circuits 55 and 57 through the selection signal line 52 are inverted from each other.

Each of the selection circuits 55 and 57 includes a tri-state buffer circuit. The tri-state buffer circuit is brought into an operating state when a signal transmitted from the selection signal line 52 is at H level and into a high impedance state when the signal is at L level.

Each of the pulse output circuit 44 included in the signal line driver circuit 43, the pulse output circuit 54 included in the first scan line driver circuit 41, and the pulse output circuit 56 included in the second scan line driver circuit 42 includes a shift register having a plurality of flip-flop circuits or a decoder circuit. If a decoder circuit is used as the pulse output circuits 44, 54 and 56, a signal line or a scan line can be selected at random. By selecting a signal line or a scan line at random, pseudo contour occurring when adopting a time gray scale method can be prevented.

The configuration of the signal line driver circuit 43 is not limited to the aforementioned one, and a level shifter or a buffer circuit may be additionally provided. The configuration of the first scan line driver circuit 41 and the second scan line driver circuit 42 is also not limited to the aforementioned one, and a level shifter or a buffer circuit may be additionally provided.

Further, in the invention, a protection circuit may be provided. The protection circuit may include a plurality of resistors. For example, P-channel transistors may be used as a plurality of resistors. The protection circuit may be provided in the signal line driver circuit 43, the first scan line driver circuit 41, or the second scan line driver circuit 42. Preferably, the protection circuit is provided between the pixel portion 40 and the signal line driver circuit 43, the first scan line driver circuit 41, or the second scan line driver circuit 42. Such a protection circuit can prevent degradation or destruction of elements due to static electricity.

In this embodiment mode, the light emitting device has a power supply control circuit 63 that includes a power supply circuit 61 for supplying power to the light emitting element 13 and a controller 62. The power supply circuit 61 includes a first power supply 17 denoted by a circle, and the first power supply 17 is connected to the pixel electrode of the light emitting element 13 through the driving transistor 12 and the power supply line Vx. The power supply circuit 61 also includes a second power supply 18 denoted by a circle, and the second power supply 18 is connected to the light emitting element 13 through a power supply line connected to the counter electrode.

When a forward bias voltage is applied to the light emitting element 13 so that the light emitting element 13 is supplied with current and emits light, the potential of the first power supply 17 is set to be higher than that of the second power supply 18 in the power supply circuit 61. On the other hand, when a reverse bias voltage is applied to the light emitting element 13, the potential of the first power supply 17 is set to be lower than that of the second power supply 18. Such a setting of the power supply can be performed by supplying a predetermined signal from the controller 62 to the power supply circuit 61.

In this embodiment mode, the light emitting device further includes a monitor circuit 64 and a control circuit 65. The control circuit 65 includes the constant current source 105 and the buffer amplifier circuit 110. The monitor circuit 64 has a monitoring light emitting element 66, a monitor controlling transistor 111, and an inverter 112.

The control circuit 65 supplies a signal for correcting a power supply potential to the power supply control circuit 63 in accordance with an output of the monitor circuit 64. The power supply control circuit 63 corrects a power supply potential supplied to the pixel portion 40 in accordance with the signal supplied from the control circuit 65.

In the light emitting device of the invention having the aforementioned structure, changes in current values due to changes in ambient temperature and degradation with time can be suppressed to increase reliability. Further, the monitor controlling transistor 111 and the inverter 112 prevent a current from the constant current source 105 from flowing to the short-circuited monitoring light emitting element 66, and allow appropriate changes in current values to be supplied to the light emitting element 13.

Embodiment Mode 6

In this embodiment mode, the operation of the light emitting device of the invention having the aforementioned structure is described with reference to drawings.

Figure 14A:
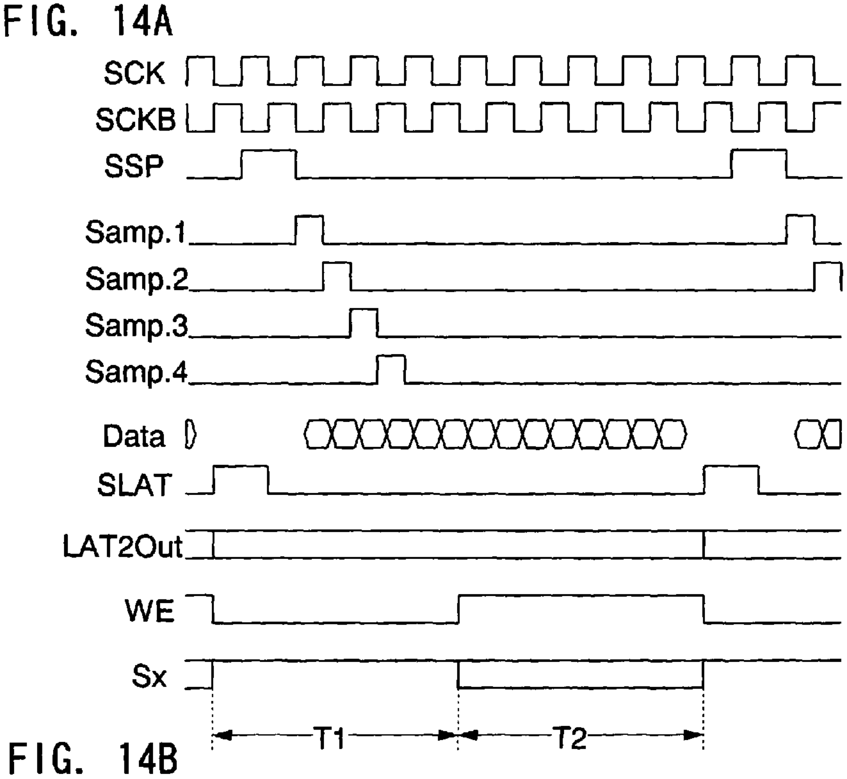
FIGS. 14A and 14B each show a timing chart of the invention.

First, the operation of the signal line driver circuit 43 is described with reference to FIG. 14A. A clock signal (hereinafter referred to as SCK), a clock inverted signal (hereinafter referred to as SCKB), and a start pulse (hereinafter referred as SSP) are inputted to the pulse output circuit 44, and a sampling pulse is outputted to the first latch 47 at the timing of these signals. The first latch 47 to which data is inputted holds video signals of the first to last columns when the sampling pulse is inputted. When a latch pulse is inputted to the second latch 48, the video signals that have been held in the first latch 47 are simultaneously transmitted to the second latch 48.

The operation of the selection circuit 46 in each period is described below, provided that an L level WE signal is transmitted from the selection signal line 52 during a period T1 while an H level WE signal is transmitted during a period T2. Each of the periods T1 and T2 corresponds to half of a horizontal scan period, and the period T1 is called a first subgate selection period whereas the period T2 is called a second subgate selection period.

During the period T1 (first subgate selection period), a WE signal transmitted from the selection signal line 52 is at L level, the TFT 49 is in an On state, and the analog switch 50 is in a non-conductive state. Then, the plurality of signal lines S1 to Sn are electrically connected to the power supply 53 through the TFT 49 provided in each column. That is to say, the potentials of the signal lines S1 to Sn become equal to the potential of the power supply 53. At this time, the switching transistor 11 included in the selected pixel 10 is on, and the potential of the power supply 53 is transmitted to the gate electrode of the driving transistor 12 through the switching transistor 11. Thus, the driving transistor 12 is turned off, no current flows through both electrodes of the light emitting element 13, and no light is emitted. In this manner, the potential of the power supply 53 is transmitted to the gate electrode of the driving transistor 12 regardless of the state of a video signal inputted to a signal line Sx, and thus the switching transistor 11 is turned off and light emission of the light emitting element 13 is forcibly stopped. Such an operation is called an erasing operation.

During the period T2 (second subgate selection period), a WE signal transmitted from the selection signal line 52 is at H level, the TFT 49 is in an Off state, and the analog switch 50 is in a conductive state. Then, the video signals that have been held in the second latch circuit 48 are simultaneously transmitted to each signal line Sx for one row. At this time, the switching transistor 11 included in the pixel 10 is turned on, and the video signal is transmitted to the gate electrode of the driving transistor 12 through the switching transistor 11. Thus, the driving transistor 12 is turned on or off depending on the inputted video signal, thereby first and second electrodes of the light emitting element 13 have different potentials or the same potential. More specifically, when the driving transistor 12 is turned on, the first and second electrodes of the light emitting element 13 have different potentials and a current flows therethrough, namely, the light emitting element 13 emits light. Note that the current flowing through the light emitting element 13 is the same as the current flowing between the source and the drain of the driving transistor 12.

On the other hand, when the driving transistor 12 is turned off, the first and second electrodes of the light emitting element 13 have the same potential and no current flows therethrough, namely, the light emitting element 13 emits no light. In this manner, the driving transistor 12 is turned on or off depending on a video signal, and the first and second electrodes of the light emitting element 13 have different potentials or the same potential. Such an operation is called a writing operation.

Figure 14B:
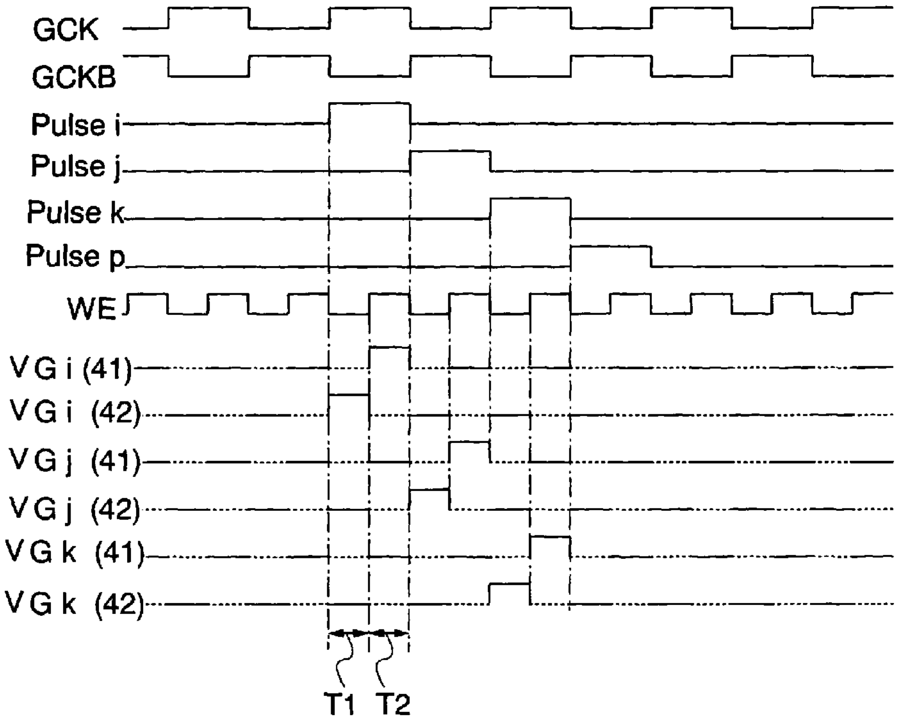

Next, the operation of the first scan line driver circuit 41 and the second scan line driver circuit 42 is described. A clock signal (G1CK), a clock inverted signal (G1CKB) and a start pulse (G1SP) are inputted to the pulse output circuit 54, and pulses are sequentially outputted to the selection circuit 55 at the timing of these signals. A clock signal (G2CK), a clock inverted signal (G2CKB) and a start pulse (G2SP) are inputted to the pulse output circuit 56, and pulses are sequentially outputted to the selection circuit 57 at the timing of these signals. FIG. 14B shows the potentials of pulses supplied to the selection circuits 55 and 57 of each of the i-th, j-th, k-th, and p-th rows (i, j, k, and p are natural numbers, 1=i, j, k, p=n).

The operation of the selection circuit 55 included in the first scan line driver circuit 41 and the selection circuit 57 included in the second scan line driver circuit 42 is described, provided that an L level WE signal is transmitted from the selection signal line 52 during a period T1 while an H level WE signal is transmitted during a period T2 similarly to in the description of the signal line driver circuit 43. Note that in the timing chart of FIG. 14B, the potential of a gate line Gy (y is a natural number, 1=y=n) that receives a signal from the first scan line driver circuit 41 is denoted by VGy (41), while the potential of a gate line that receives a signal from the second scan line driver circuit 42 is denoted by VGy (42). The potentials VGy (41) and VGy (42) can be supplied from the same gate line Gy.

During the period T1 (first subgate selection period), a WE signal transmitted from the selection signal line 52 is at L level. Thus, an L level WE signal is inputted to the selection circuit 55 included in the first scan line driver circuit 41, thereby the selection circuit 55 is brought into a floating state. On the other hand, an inverted WE signal, namely an H level signal is inputted to the selection circuit 57 included in the second scan line driver circuit 42, thereby the selection circuit 57 is brought into an operating state. That is to say, the selection circuit 57 transmits an H level signal (row selection signal) to a gate line Gi of the i-th row so that the gate line Gi has the same potential as the H level signal. In other words, the gate line Gi of the i-th row is selected by the second scan line driver circuit 42. As a result, the switching transistor 11 included in the pixel 10 is turned on. Then, the potential of the power supply 53 included in the signal line driver circuit 43 is transmitted to the gate electrode of the driving transistor 12, the driving transistor 12 is turned off, and the two electrodes of the light emitting element 13 have the same potential. That is to say, the erasing operation where the light emitting element 13 emits no light is performed in this period.

During the period T2 (second subgate selection period), a WE signal transmitted from the selection signal line 52 is at H level. Thus, an H level WE signal is inputted to the selection circuit 55 included in the first scan line driver circuit 41, thereby the selection circuit 55 is brought into an operating state. That is to say, the selection circuit 55 transmits an H level signal to the gate line Gi of the i-th row so that the gate line Gi has the same potential as the H level signal. In other words, the gate line Gi of the i-th row is selected by the first scan line driver circuit 41. As a result, the switching transistor 11 included in the pixel 10 is turned on. Then, the video signal is transmitted from the second latch 48 included in the signal line driver circuit 43 to the gate electrode of the driving transistor 12, the driving transistor 12 is turned on or off, and the two electrodes of the light emitting element 13 have different potentials or the same potential. That is to say, the writing operation where the light emitting element 13 emits light or no light is performed in this period. Meanwhile, the selection circuit 57 included in the second scan line driver circuit 42 is inputted with an L level signal, and brought into a floating state.

As set forth above, the gate line Gy is selected by the second scan line driver circuit 42 during the period T1 (first subgate selection period) while selected by the first scan line driver circuit 41 during the period T2 (second subgate selection period). That is to say, the gate line is controlled by the first scan line driver circuit 41 and the second scan line driver circuit 42 in a complementary manner. The erasing operation is performed during one of the first and second subgate selection periods, and the writing operation is performed during the other thereof.

During a period when the first scan line driver circuit 41 selects the gate line Gi of the i-th row, the second scan line driver circuit 42 does not operate (the selection circuit 57 is in a floating state), or transmits a row selection signal to the gate lines of rows other than the i-th row. Similarly, during a period when the second scan line driver circuit 42 transmits a row selection signal to the gate line Gi of the i-th row, the first scan line driver circuit 41 is in a floating state, or transmits a row selection signal to the gate lines of rows other than the i-th row.

According to the invention performing the aforementioned operations, the light emitting element 13 can be forcibly turned off, leading to an increased duty ratio. Further, the light emitting element 13 can be forcibly turned off without providing a TFT for discharging the charges of the capacitor 16, which results in a high aperture ratio. When the high aperture ratio is achieved, the luminance of the light emitting element can be reduced with the increase in light emitting area. That is to say, the driving voltage can be reduced and thus power consumption can be reduced.

In this embodiment mode, the scan period of the signal line driver circuit 43 is required to be twice as long as usual. In order to achieve this, the frequency of SCK and SCKB of the signal line driver circuit 43 may be increased, or a video signal may be divided into a plurality of signals.

The invention is not limited to the aforementioned mode where the gate selection period is divided into the two periods. The gate selection period may be divided into three or more periods.

Embodiment Mode 7

Described in this embodiment mode is an example of a pixel configuration to which the aforementioned driving method can be applied. Note that the description of the same configuration as that shown in FIG. 2 is omitted.

Figure 9:
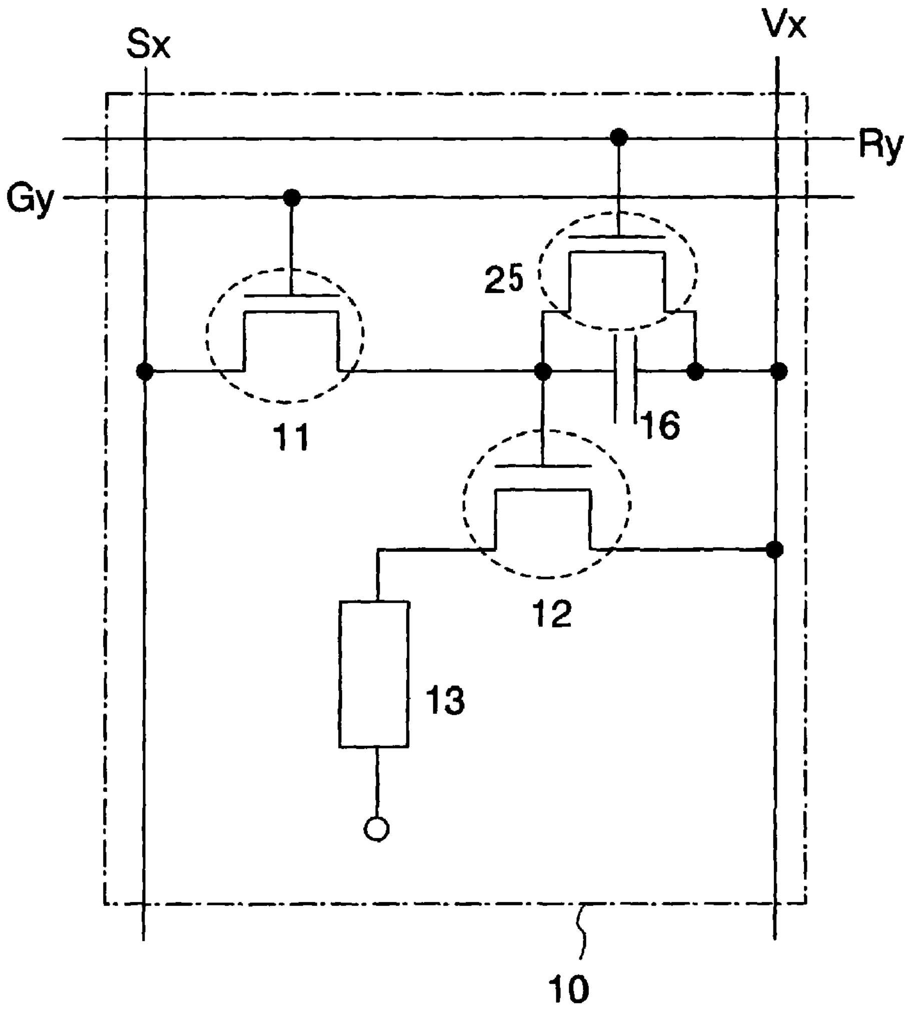
FIG. 9 shows an equivalent circuit of a pixel of the invention.

FIG. 9 shows a pixel configuration where a third transistor 25 is provided between both ends of the capacitor 16 in addition to the pixel configuration shown in FIG. 2. The third transistor 25 has a function of discharging the charges accumulated in the capacitor 16 during a predetermined period. The third transistor 25 is also referred to as an erasing transistor. The predetermined period is controlled by an erasing scan line Ry connected to a gate electrode of the third transistor 25.

Figure 24:
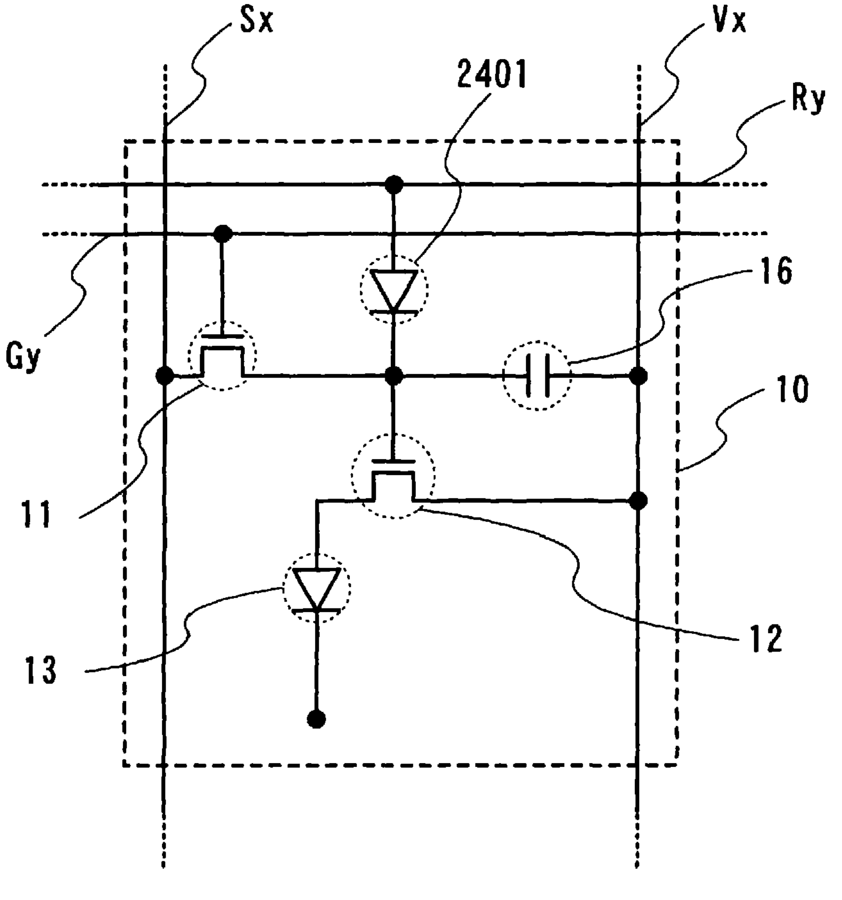
FIG. 24 shows an equivalent circuit of a pixel of the invention.

FIG. 24 shows a pixel configuration where an erasing diode 2401 is provided in addition to the pixel configuration shown in FIG. 2. The erasing diode 2401 has a function of discharging the charges accumulated in the capacitor 16 during a predetermined period. An output of the erasing diode 2401 is connected to the gate of the driving transistor 12, and the predetermined period is controlled by the erasing scan line Ry connected to an input of the erasing diode 2401.

Figure 25:
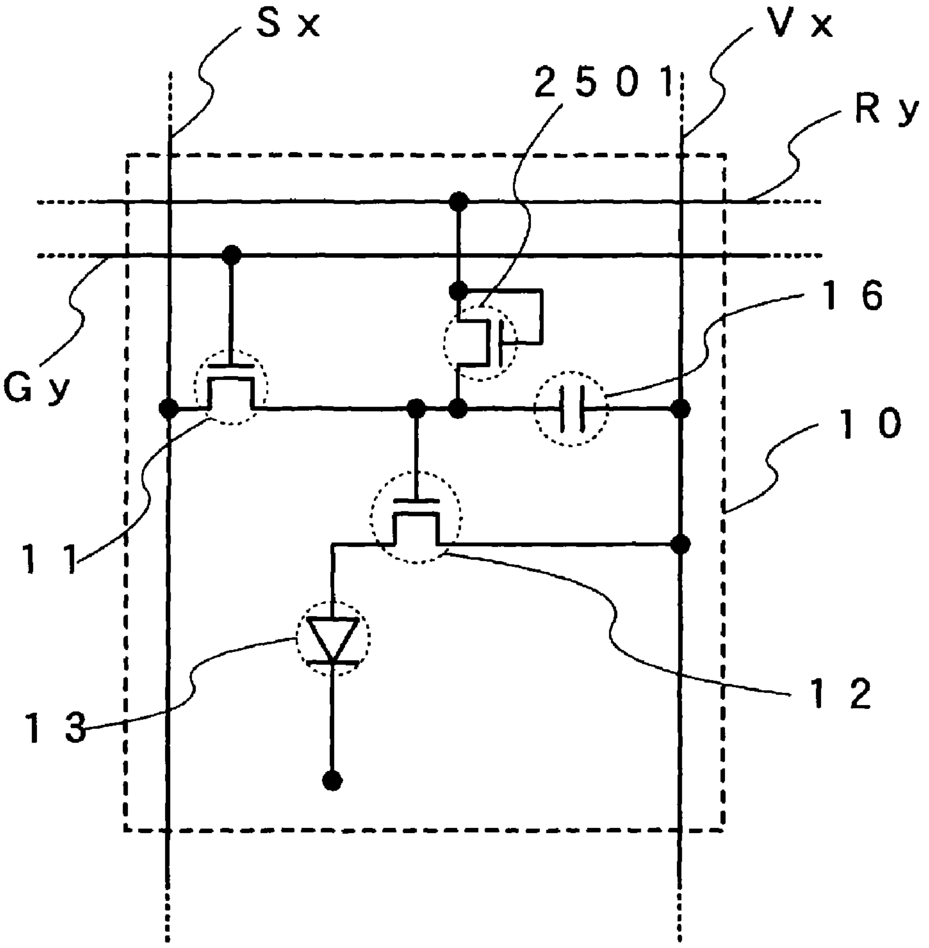
FIG. 25 shows an equivalent circuit of a pixel of the invention.

FIG. 25 shows a pixel configuration where a diode-connected erasing transistor 2501 is provided in addition to the pixel configuration shown in FIG. 2. The erasing transistor 2501 has a function of discharging the charges accumulated in the capacitor 16 during a predetermined period. A gate electrode of the erasing transistor 2501 is connected to the erasing scan line Ry, and the predetermined period is controlled by the erasing scan line Ry.

Figure 26:
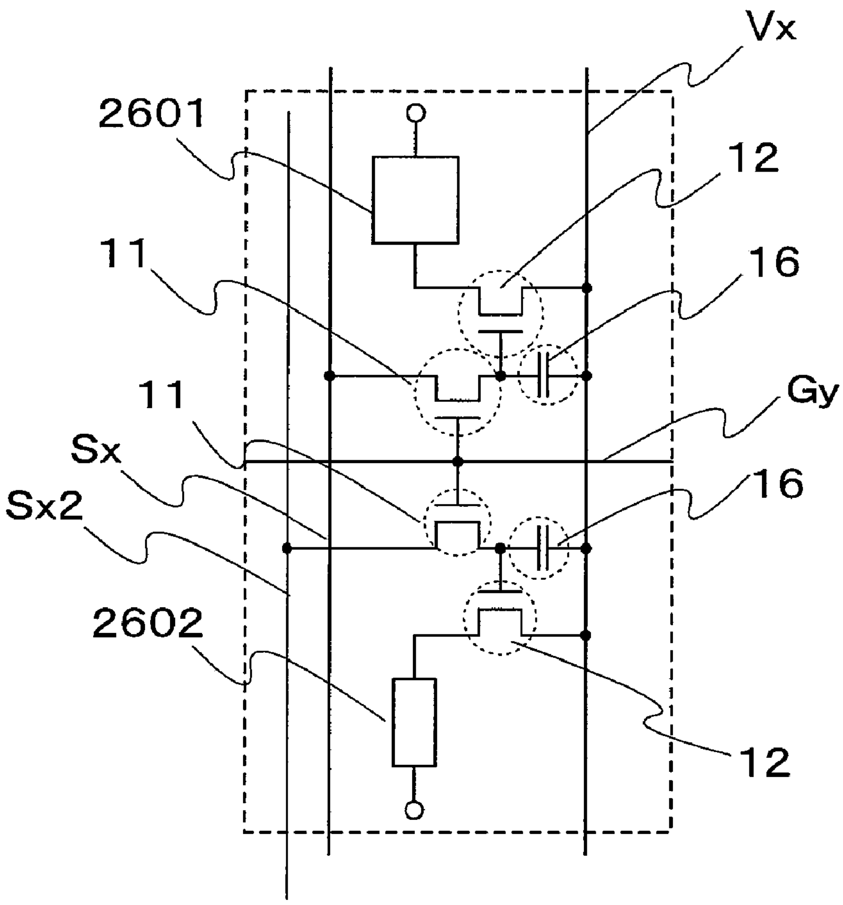
FIG. 26 shows an equivalent circuit of a pixel of the invention.

FIG. 26 shows a pixel configuration where Gy and Vx are used in common for two pixels in the pixel configuration shown in FIG. 2, data signals are inputted to the pixels from Sx and Sx2, and the configuration shown in FIG. 26 is regarded as one pixel to enable area gray scale display. A light emitting element 2601 and a light emitting element 2602 shown in FIG. 26 have different light emitting areas, and a gray scale can be expressed depending on a light emitting area. In addition, the pixel configuration shown in FIG. 26 may be combined with a digital time gray scale drive where a gray scale is expressed by controlling a light emitting period, or a voltage program analog gray scale drive where a gray scale is expressed by controlling Vgs of the driving transistor 12 using the potential of a data signal.

For example, if a plurality of subframe periods are provided, the charges of the capacitor 16 are discharged by the third transistor 25 shown in FIG. 9 in a short subframe period. As a result, the duty ratio can be increased.

FIG. 10A shows a pixel configuration where a fourth transistor 36 is provided between the driving transistor 12 and the light emitting element 13 in addition to the pixel configuration shown in FIG. 2. A gate electrode of the fourth transistor 36 is connected to a second power supply line Vax that has a fixed potential. Accordingly, a constant current can be supplied to the light emitting element 13 regardless of a gate-source voltage of the driving transistor 12 and the fourth transistor 36. The fourth transistor 36 is also referred to as a current controlling transistor.

FIG. 10B shows a pixel configuration different from that shown in FIG. 10A, where the second power supply line Vax having a fixed potential is provided in parallel to the scan line Gy.

FIG. 10C shows a pixel configuration different from those shown in FIGS. 10A and 10B, where the gate electrode of the fourth transistor 36, which has a fixed potential, is connected to the gate electrode of the driving transistor 12. According to the pixel configuration shown in FIG. 10C, where a new power supply line is not required, the aperture ratio can be maintained.

Figure 11:
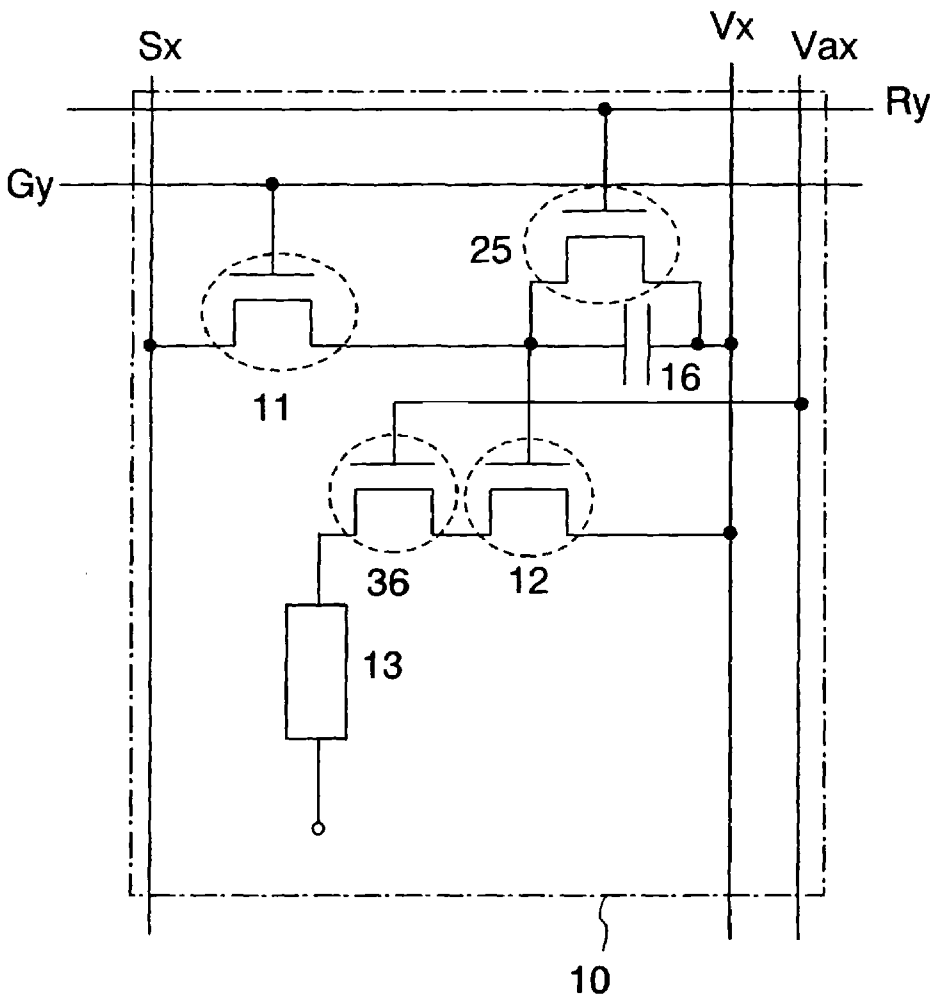
FIG. 11 shows an equivalent circuit of a pixel of the invention.

FIG. 11 shows a pixel configuration where the erasing transistor 25 shown in FIG. 9 is provided in addition to the pixel configuration shown in FIG. 10A. The erasing transistor 25 allows the charges of the capacitor 26 to be discharged. It is needless to say that the erasing transistor 25 may be provided in addition to the pixel configuration shown in FIG. 10B or FIG. 10C.

That is to say, the invention can be applied to any circuit configuration.

Embodiment Mode 8

Described in this embodiment mode is the structure of the whole light emitting device having a pixel circuit using a decoder circuit in the case where the writing period Ta shown in Embodiment Mode 4 is divided into two operating periods, during both of which the writing operation is performed.

Figure 13:
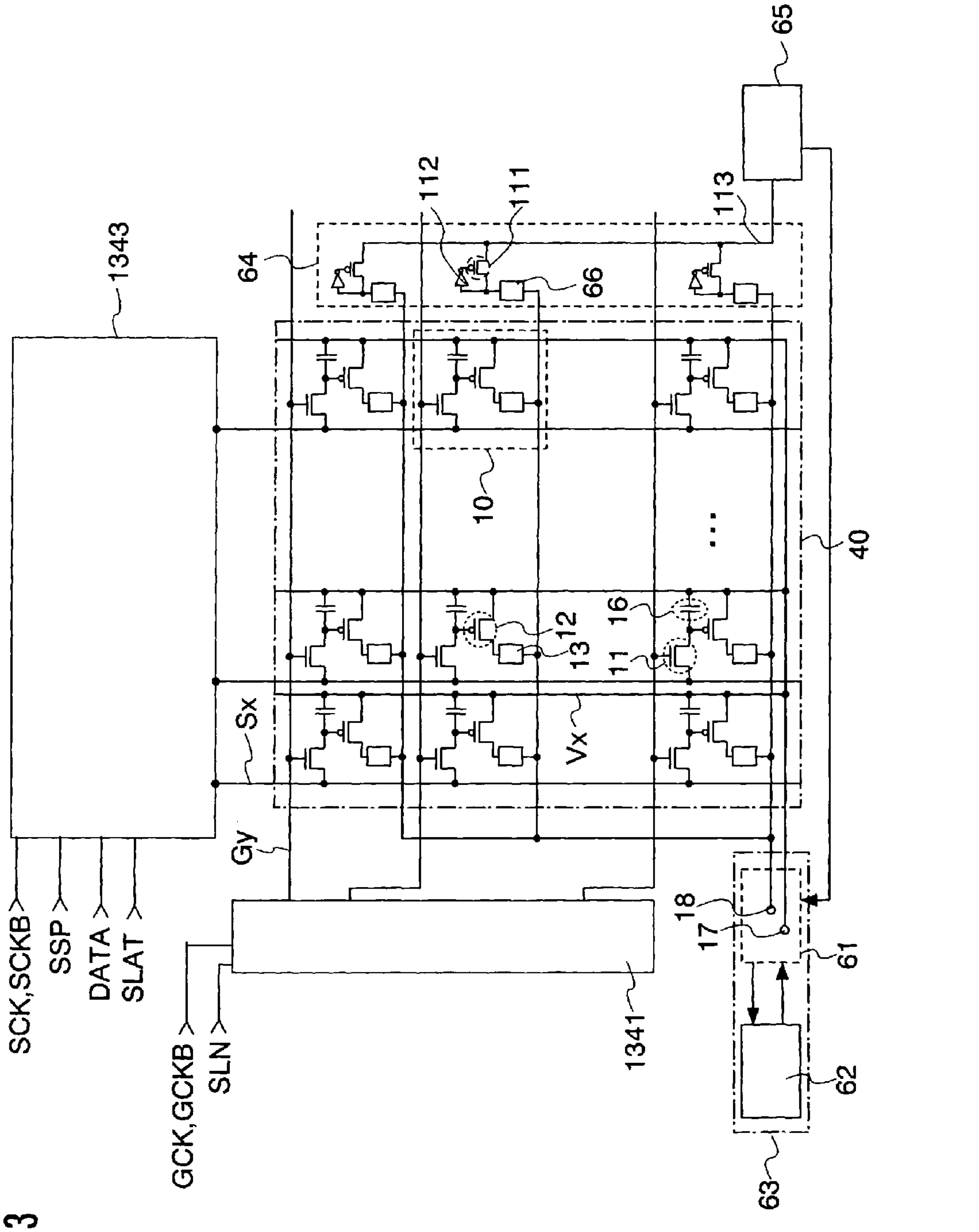
FIG. 13 shows a light emitting device of the invention.

As shown in FIG. 13, a light emitting device of the invention includes the pixel portion 40 where the plurality of pixels 10 are arranged in matrix, which is described in Embodiment Mode 4, a decoder circuit 1341, and a signal line driver circuit 1343. The decoder circuit may be arranged on one of the four sides of the pixel portion 40.

The signal line driver circuit 1343 may be any circuit as long as it can simultaneously output one row of potentials corresponding to a video signal (DATA) (hereinafter referred to as a line sequential drive). For example, the signal line driver circuit shown in FIG. 12 may be used.

An input for selecting an output line (SLN: Select Line Number) is inputted to the decoder circuit 1341. In addition, a clock pulse (GCK) and an inverted clock pulse (GCKB) are inputted to the decoder circuit 1341.

A decoder circuit is not necessarily used as the decoder circuit 1341, and for example, a shift register may be used as well. In that case, if a writing period is divided into N periods as described in Embodiment Modes 5 and 6, N scan line driver circuits are required.

Further, in the invention, a protection circuit may be provided. The protection circuit may include a plurality of resistors. For example, P-channel transistors may be used as a plurality of resistors. The protection circuit may be provided in the signal line driver circuit 1343 and the decoder circuit 1341. Preferably, the protection circuit is provided between the pixel portion 40 and each of the signal line driver circuit 1343 and the decoder circuit 1341. Such a protection circuit can prevent degradation or destruction of elements due to static electricity.

In this embodiment mode, the light emitting device has the power supply control circuit 63 that includes the power supply circuit 61 for supplying power to the light emitting element 13 and the controller 62. The power supply circuit 61 includes the first power supply 17 denoted by a circle, and the first power supply 17 is connected to the pixel electrode of the light emitting element 13 through the driving transistor 12 and the power supply line Vx. The power supply circuit 61 also includes a second power supply 18 denoted by a circle, and the second power supply 18 is connected to the light emitting element 13 through the power supply line connected to the counter electrode.

When a forward bias voltage is applied to the light emitting element 13 so that the light emitting element 13 is supplied with current and emits light, the potential of the first power supply 17 is set to be higher than that of the second power supply 18 in such a power supply circuit 61. On the other hand, when a reverse bias voltage is applied to the light emitting element 13, the potential of the first power supply 17 is set to be lower than that of the second power supply 18. Such a setting of the power supply can be performed by supplying a predetermined signal from the controller 62 to the power supply circuit 61.

In this embodiment mode, the light emitting device further includes the monitor circuit 64 and the control circuit 65. The control circuit 65 includes the constant current source 105 and the buffer amplifier circuit 110. The monitor circuit 64 has the monitoring light emitting element 66, the monitor controlling transistor 111, and the inverter 112.

The control circuit 65 supplies a signal for correcting a power supply potential to the power supply control circuit 63 in accordance with an output of the monitor circuit 64. The power supply control circuit 63 corrects a power supply potential supplied to the pixel portion 40 in accordance with the signal supplied from the control circuit 65.

In the light emitting device of the invention having the aforementioned structure, changes in current values due to changes in ambient temperature and degradation with time can be suppressed to increase reliability. Further, the monitor controlling transistor 111 and the inverter 112 prevent a current from the constant current source 105 from flowing to the short-circuited monitoring light emitting element 66, and allow appropriate changes in current values to be supplied to the light emitting element 13.

Embodiment Mode 9

In this embodiment mode, the operation of the light emitting device of the invention having the aforementioned structure is described with reference to drawings.

Figure 15A:
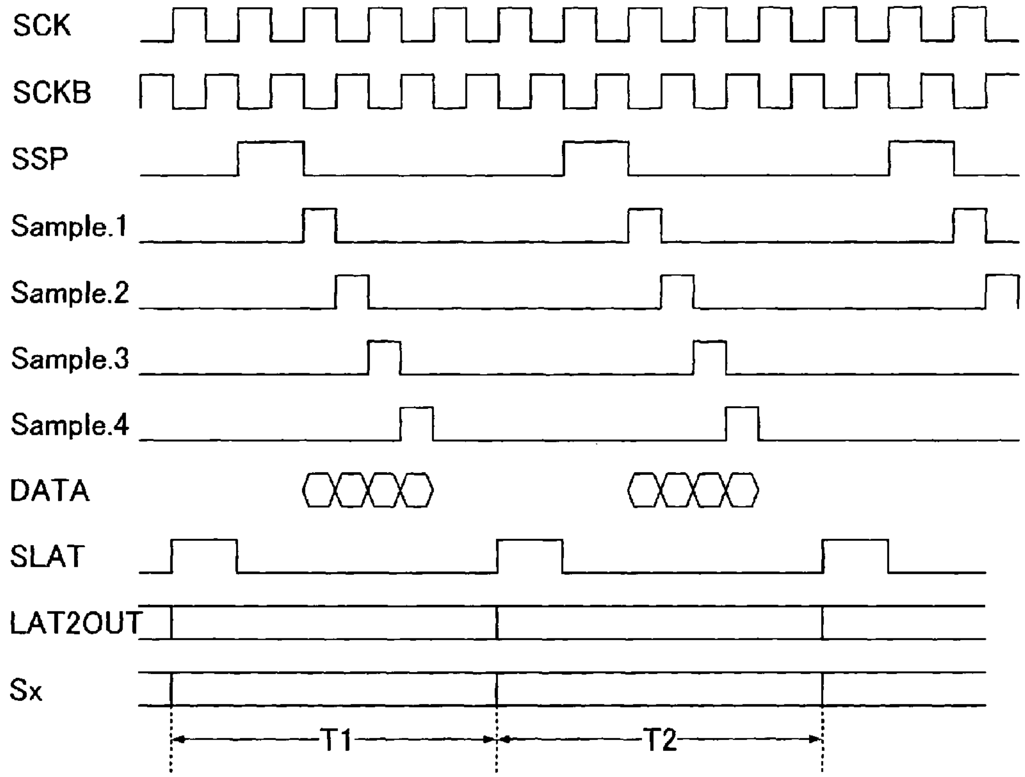
FIGS. 15A and 15B each show a timing chart of the invention.

First, the operation of the signal line driver circuit 1343 is described with reference to FIG. 15A. A clock signal (hereinafter referred to as SCK), a clock inverted signal (hereinafter referred to as SCKB), and a start pulse (hereinafter referred as SSP) are inputted to the signal line driver circuit 1343. The signal line driver circuit 1343 may be a known circuit, and is not specifically limited as long as it has a circuit configuration capable of achieving FIG. 15A.

In Embodiment Mode 6, the writing period is divided into the period T1 and the period T2 using a WE signal transmitted from the selection signal line 52; however, in this embodiment mode using the decoder circuit 1341, the WE signal is not required and the writing period can be similarly divided into a plurality of periods using an SLN signal. In this embodiment mode, the timing is described in the case where the writing operation is performed twice during one row selection period. The two writing periods T1 and T2 are referred to as a first subgate selection period and a second subgate selection period respectively.

During the period T1 (first subgate selection period) and the period T2 (second subgate selection period), a potential corresponding to a DATA signal is outputted from the signal line driver circuit 1343. At this time, the switching transistor 11 included in the pixel 10 is turned on, and a video signal is transmitted to the gate electrode of the driving transistor 12 through the switching transistor 11. Then, the driving transistor 12 is turned on or off depending on the inputted video signal, the first and second electrodes of the light emitting element 13 have different potentials, and a current flows through the light emitting element 13. Thus, the light emitting element 13 emits light. Note that the current flowing through the light emitting element 13 is the same as the current flowing between the source and the drain of the driving transistor 12.

On the other hand, when the driving transistor 12 is turned off, the first and second electrodes of the light emitting element 13 have the same potential and no current flows through the light emitting element 13. That is to say, the light emitting element 13 emits no light. Such operation that the driving transistor 12 is turned on or off depending on a video signal, and the first and second electrodes of the light emitting element 13 have different potentials or the same potential is called a writing operation.

Figure 15B:
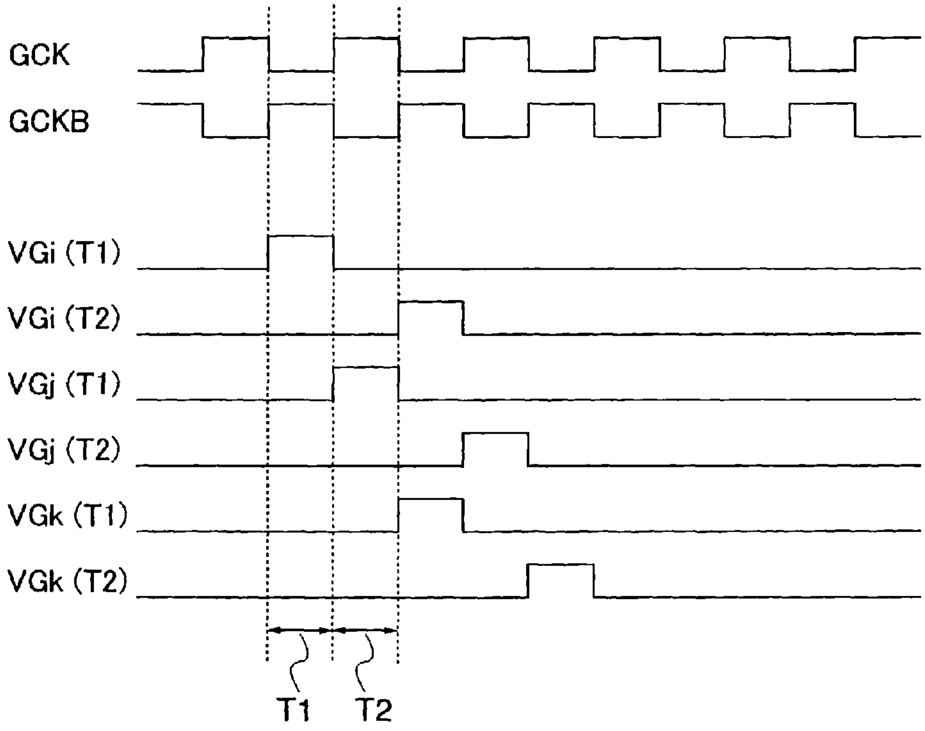

Next, the operation of the decoder circuit 1341 is described. Signals GCK, GCKB, and SLN are inputted to the decoder circuit 1341. The signal SLN selects a line outputted from the decoder circuit 1341. FIG. 15B shows the potentials of pulses outputted to the gate line Gy of each of the i-th, j-th, k-th, and p-th rows (i, j, k, and p are natural numbers, 1=i, j, k, p=n). FIG. 15B shows the potentials of pulses supplied to the selection circuits 55 and 57 of each of the i-th, j-th, k-th, and p-th rows (i, j, k, and p are natural numbers, 1=i, j, k, p=n).

The writing period can be divided into the period T1 and the period T2 similarly to in the description of the signal line driver circuit 1343. Note that in the timing chart of FIG. 15B, the potential of a gate line Gy (y is a natural number, 1=y=n) that receives a signal from the decoder circuit 1341 during the period T1 is denoted by VGy (T1), while the potential of a gate line Gy that receives a signal from the decoder circuit 1341 during the period T2 is denoted by VGy (T2). The potentials VGy (T1) and VGy (T2) can be supplied from the same gate line Gy. During each of the period T1 and the period T2, the gate line Gy is scanned.

During the period T1 (first subgate selection period), the decoder circuit 1341 transmits an H level signal (row selection signal) to the gate line Gi of the i-th row, thereby the gate line Gi has the same potential as the H level signal. That is to say, the gate line Gi of the i-th row is selected by the decoder circuit 1341. As a result, the switching transistor 11 included in the pixel 10 is turned on. Then, the potential of the power supply 53 included in the signal line driver circuit 1343 is transmitted to the gate electrode of the driving transistor 12, the driving transistor 12 is turned on or off, and the two electrodes of the light emitting element 13 have different potentials or the same potential. In other words, during this period, the writing operation where the light emitting element 13 emits light or no light is performed.

During the period T2 (second subgate selection period), the decoder circuit 1341 transmits an H level signal (row selection signal) to the gate line Gi of the i-th row, thereby the gate line Gi has the same potential as the H level signal. That is to say, the gate line Gi of the i-th row is selected by the decoder circuit 1341. As a result, the switching transistor 11 included in the pixel 10 is turned on. Then, the potential of the power supply 53 included in the signal line driver circuit 1343 is transmitted to the gate electrode of the driving transistor 12, the driving transistor 12 is turned on or off, and the two electrodes of the light emitting element 13 have different potentials or the same potential. In other words, during this period, the writing operation where the light emitting element 13 emits light or no light is performed.

In this manner, the gate line Gy is selected by the decoder circuit 1341 during the period T1 (first subgate selection period), and the gate line of another row is selected by the decoder circuit 1341 during the period T2 (second subgate selection period). That is to say, the writing operation is performed during both of the first and second subgate selection periods.

Thus, according to the invention, the signal line driver circuit 1343 performs the writing operation twice during the writing period, thereby outputting a signal to each gate line Gy selected during the period T1 and the period T2.

In this embodiment mode, the scan period of the signal line driver circuit 1343 is required to be twice as long as usual. In order to achieve this, the frequency of SCK and SCKB of the signal line driver circuit 1343 may be increased, or a video signal may be divided into a plurality of signals.

The invention is not limited to the aforementioned mode where the gate selection period is divided into the two periods. The gate selection period may be divided into three or more periods. In addition, the writing operation and the erasing operation may be performed in any combination during divided gate selection periods. For example, the gate selection period may be divided into three periods, so that the writing operation is performed during two of the three periods and the erasing operation is performed during the rest.

Embodiment Mode 10

Described in this embodiment mode is the structure of the whole light emitting device having a pixel circuit in the case where the writing period Ta shown in Embodiment Mode 4 is divided into four operating periods, during all of which the writing operation is performed.

Figure 18:
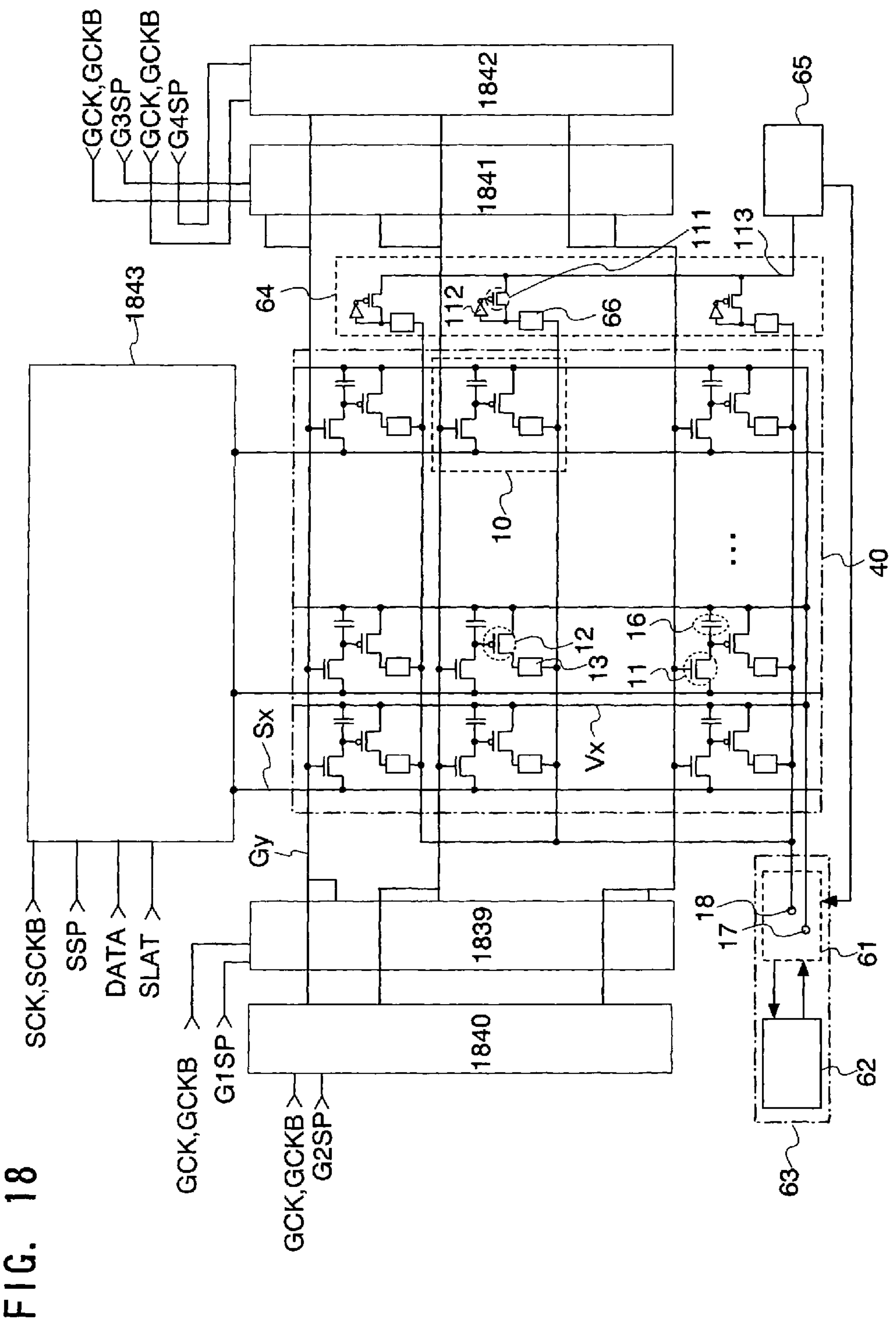
FIG. 18 shows a light emitting device of the invention.

As shown in FIG. 18, a light emitting device of the invention includes the pixel portion 40 where the plurality of pixels 10 are arranged in matrix, which is described in Embodiment Mode 4, a first scan line driver circuit 1839, a second scan line driver circuit 1840, a third scan line driver circuit 1841, a fourth scan line driver circuit 1842, and a signal line driver circuit 1843. Each two of the first scan line driver circuit 1839, the second scan line driver circuit 1840, the third scan line driver circuit 1841, and the fourth scan line driver circuit 1842 may be arranged so as to face each other with the pixel portion 40 interposed therebetween, or may be arranged on one of the four sides of the pixel portion 40. Alternatively, the four circuits may be divided into one and three circuits, and the position of arrangement is not specifically limited.

The signal line driver circuit 1843 may be any circuit as long as it can simultaneously output one row of potentials corresponding to a video signal (DATA) (hereinafter referred to as a line sequential drive). For example, the signal line driver circuit shown in FIG. 12 may be used.

Start pulses (G1SP, G2SP, G3SP, G4SP), clock pulses (G1CK, G2CK, G3CK, G4CK), inverted clock pulses thereof (G1CKB, G2CKB, G3CKB, G4CKB) are inputted to the first scan line driver circuit 1839, the second scan line driver circuit 1840, the third scan line driver circuit 1841, and the fourth scan line driver circuit 1842 respectively, as well as a WE1 signal and a WE2 signal.

Further, in the invention, a protection circuit may be provided. The protection circuit may include a plurality of resistors. For example, P-channel transistors may be used as a plurality of resistors. The protection circuit may be provided in the signal line driver circuit 1843, the first scan line driver circuit 1839, the second scan line driver circuit 1840, the third scan line driver circuit 1841, and the fourth scan line driver circuit 1842. Preferably, the protection circuit is provided between the pixel portion 40 and each of the signal line driver circuit 1843, the first scan line driver circuit 1839, the second scan line driver circuit 1840, the third scan line driver circuit 1841, and the fourth scan line driver circuit 1842. Such a protection circuit can prevent degradation or destruction of elements due to static electricity.

In this embodiment mode, the light emitting device has the power supply control circuit 63 that includes the power supply circuit 61 for supplying power to the light emitting element 13 and the controller 62. The power supply circuit 61 includes the first power supply 17 denoted by a circle, and the first power supply 17 is connected to the pixel electrode of the light emitting element 13 through the driving transistor 12 and the power supply line Vx. The power supply circuit 61 also includes the second power supply 18 denoted by a circle, and the second power supply 18 is connected to the light emitting element 13 through the power supply line connected to the counter electrode.

When a forward bias voltage is applied to the light emitting element 13 so that the light emitting element 13 is supplied with current and emits light, the potential of the first power supply 17 is set to be higher than that of the second power supply 18 in such a power supply circuit 61. On the other hand, when a reverse bias voltage is applied to the light emitting element 13, the potential of the first power supply 17 is set to be lower than that of the second power supply 18. Such a setting of the power supply can be performed by supplying a predetermined signal from the controller 62 to the power supply circuit 61.

In this embodiment mode, the light emitting device further includes the monitor circuit 64 and the control circuit 65. The control circuit 65 includes the constant current source 105 and the buffer amplifier circuit 110. The monitor circuit 64 has the monitoring light emitting element 66, the monitor controlling transistor 111, and the inverter 112.

The control circuit 65 supplies a signal for correcting a power supply potential to the power supply control circuit 63 in accordance with an output of the monitor circuit 64. The power supply control circuit 63 corrects a power supply potential supplied to the pixel portion 40 in accordance with the signal supplied from the control circuit 65.

In the light emitting device of the invention having the aforementioned structure, changes in current values due to changes in ambient temperature and degradation with time can be suppressed to increase reliability. Further, the monitor controlling transistor 111 and the inverter 112 prevent a current from the constant current source 105 from flowing to the short-circuited monitoring light emitting element 66, and allow appropriate changes in current values to be supplied to the light emitting element 13.

Embodiment Mode 11

In this embodiment mode, the operation of the light emitting device of the invention having the aforementioned structure is described with reference to drawings.

Figure 19A:
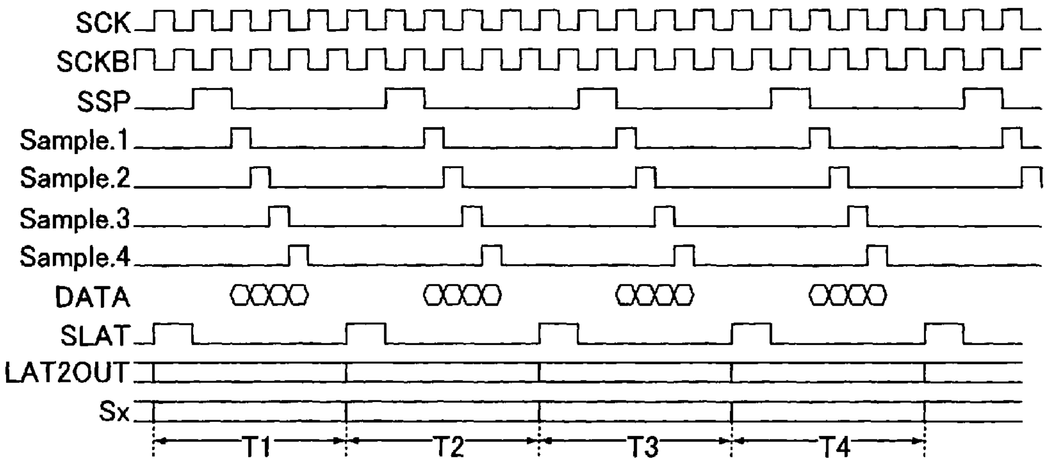
FIGS. 19A and 19B each show a timing chart of the invention.

First, the operation of the signal line driver circuit 1843 is described with reference to FIG. 19A. A clock signal (hereinafter referred to as SCK), a clock inverted signal (hereinafter referred to as SCKB), and a start pulse (hereinafter referred as SSP) are inputted to the signal line driver circuit 1843. The signal line driver circuit 1843 may be a known circuit, and is not specifically limited as long as it has a circuit configuration capable of achieving FIG. 19A.

In Embodiment Mode 6, the writing period is divided into the period T1 and the period T2 using a WE signal transmitted from the selection signal line 52; however, since the erasing operation is not performed in this embodiment mode, the WE1 signal and the WE2 signal are not inputted to the signal line driver circuit 1843. In this embodiment mode, the timing is described in the case where the writing operation is performed four times during one row selection period. The four writing periods T1, T2, T3, and T4 are referred to as a first subgate selection period, a second subgate selection period, a third subgate selection period, and a fourth subgate selection period respectively.

During the period T1 (first subgate selection period), the period T2 (second subgate selection period), the period T3 (third subgate selection period), and the period T4 (fourth subgate selection period), a potential corresponding to a DATA signal is outputted from the signal line driver circuit 1843. At this time, the switching transistor 11 included in the pixel 10 is turned on, and a video signal is transmitted to the gate electrode of the driving transistor 12 through the switching transistor 11. Then, the driving transistor 12 is turned on or off depending on the inputted video signal, the first and second electrodes of the light emitting element 13 have different potentials, and a current flows through the light emitting element 13. Thus, the light emitting element 13 emits light. Note that the current flowing through the light emitting element 13 is the same as the current flowing between the source and the drain of the driving transistor 12.

On the other hand, when the driving transistor 12 is turned off, the first and second electrodes of the light emitting element 13 have the same potential and no current flows through the light emitting element 13. That is to say, the light emitting element 13 emits no light. Such operation that the driving transistor 12 is turned on or off depending on a video signal, and the first and second electrodes of the light emitting element 13 have different potentials or the same potential is called a writing operation.

Figure 19B:
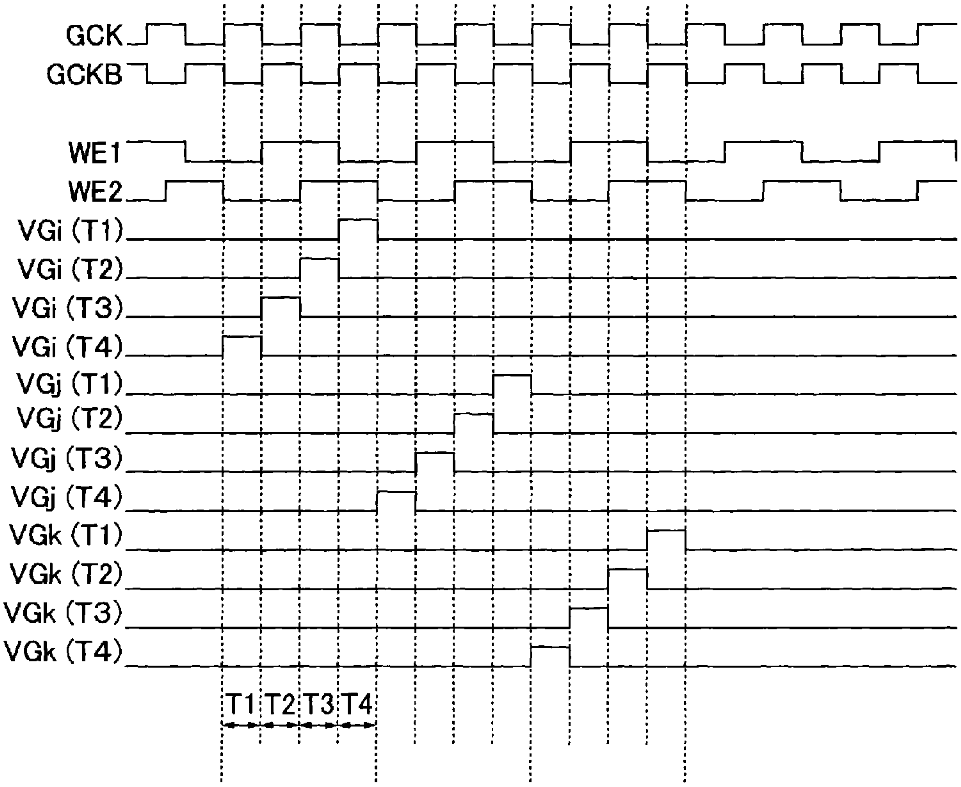

Next, the operation of the first scan line driver circuit 1839, the second scan line driver circuit 1840, the third scan line driver circuit 1841, and the fourth scan line driver circuit 1842 is described. Signals GCK, GCKB, G1SP, WE1, and WE2 are inputted to the scan line driver circuit 1839. Sequential scan is performed in accordance with GCK, GCKB, and G1SP, and whether a signal is outputted to the gate line Gy is determined by WE1 and WE2. Signals GCK, GCKB, G2SP, WE1, and WE2 are inputted to the scan line driver circuit 1840. Sequential scan is performed in accordance with GCK, GCKB, and G2SP, and whether a signal is outputted to the gate line Gy is determined by WE1 and WE2. Signals GCK, GCKB, G3SP, WE1, and WE2 are inputted to the scan line driver circuit 1841. Sequential scan is performed in accordance with GCK, GCKB, and G3SP, and whether a signal is outputted to the gate line Gy is determined by WE1 and WE2. Signals GCK, GCKB, G4SP, WE1, and WE2 are inputted to the scan line driver circuit 1842. Sequential scan is performed in accordance with GCK, GCKB, and G4SP, and whether a signal is outputted to the gate line Gy is determined by WE1 and WE2. FIG. 19B shows the potentials of pulses outputted to the gate line Gy of each of the i-th, j-th, k-th, and p-th rows (i, j, k, and p are natural numbers, 1=i, j, k, p=n). FIG. 19B shows the potentials of pulses supplied to the selection circuits 55 and 57 of each of the i-th, j-th, k-th, and p-th rows (i, j, k, and p are natural numbers, 1=i, j, k, p=n).

The writing period can be divided into the period T1, the period T2, the period T3, and the period T4 similarly to in the description of the signal line driver circuit 1843. The operation of the first scan line driver circuit 1839, the second scan line driver circuit 1840, the third scan line driver circuit 1841, and the fourth scan line driver circuit 1842 in each period is described, provided that the WE1 signal is at L level while the WE2 signal is at L level during the period T1, the WE1 signal is at H level while the WE2 signal is at L level during the period T2, the WE1 signal is at H level while the WE2 signal is at H level during the period T3, and the WE1 signal is at L level while the WE2 signal is at H level during the period T4. In the timing chart of FIG. 19B, the potential of a gate line Gy (y is a natural number, 1=y=n) that receives a signal from the first scan line driver circuit 1839 is denoted by VGy (T1), the potential of a gate line Gy (y is a natural number, 1=y=n) that receives a signal from the second scan line driver circuit 1840 is denoted by VGy (T2), the potential of a gate line Gy (y is a natural number, 1=y=n) that receives a signal from the third scan line driver circuit 1841 is denoted by VGy (T3), and the potential of a gate line Gy (y is a natural number, 1=y=n) that receives a signal from the fourth scan line driver circuit 1842 is denoted by VGy (T4). The potentials VGy (T1), VGy (T2), VGy (T3), and VGy (T4) can be supplied from the same gate line Gy.

During the period T1 (first subgate selection period), the WE1 signal is at L level and the WE2 signal is at L level. Thus, an L level WE1 signal and an L level WE2 signal are inputted to the second scan line driver circuit 1840, the third scan line driver circuit 1841, and the fourth scan line driver circuit 1842; thereby the second scan line driver circuit 1840, the third scan line driver circuit 1841, and the fourth scan line driver circuit 1842 are brought into a floating state. On the other hand, an L level WE1 signal and an L level WE2 signal are also inputted to the first scan line driver circuit 1839, the first scan line driver circuit 1839 transmits an H level signal to the gate line Gi of the i-th row, and the gate line Gi has the same potential as the H level signal. That is to say, the gate line Gi of the i-th row is selected by the first scan line driver circuit 1839. As a result, the switching transistor 11 included in the pixel 10 is turned on. Then, the potential of the power supply 53 included in the signal line driver circuit 1843 is transmitted to the gate electrode of the driving transistor 12, the driving transistor 12 is turned on or off, and the two electrodes of the light emitting element 13 have different potentials or the same potential. That is to say, the writing operation where the light emitting element 13 emits light or no light is performed in this period.

During the period T2 (second subgate selection period), the WE1 signal is at H level and the WE2 signal is at L level. Thus, an H level WE1 signal and an L level WE2 signal are inputted to the first scan line driver circuit 1839, the third scan line driver circuit 1841, and the fourth scan line driver circuit 1842; thereby the first scan line driver circuit 1839, the third scan line driver circuit 1841, and the fourth scan line driver circuit 1842 are brought into a floating state. On the other hand, an H level WE1 signal and an L level WE2 signal are also inputted to the second scan line driver circuit 1840, the second scan line driver circuit 1840 transmits an H level signal to the gate line Gi of the i-th row, and the gate line Gi has the same potential as the H level signal. That is to say, the gate line Gi of the i-th row is selected by the second scan line driver circuit 1840. As a result, the switching transistor 11 included in the pixel 10 is turned on. Then, the potential of the power supply 53 included in the signal line driver circuit 1843 is transmitted to the gate electrode of the driving transistor 12, the driving transistor 12 is turned on or off, and the two electrodes of the light emitting element 13 have different potentials or the same potential. That is to say, the writing operation where the light emitting element 13 emits light or no light is performed in this period.

During the period T3 (third subgate selection period), the WE1 signal is at H level and the WE2 signal is at H level. Thus, an H level WE1 signal and an H level WE2 signal are inputted to the first scan line driver circuit 1839, the second scan line driver circuit 1840, and the fourth scan line driver circuit 1842; thereby the first scan line driver circuit 1839, the second scan line driver circuit 1840, and the fourth scan line driver circuit 1842 are brought into a floating state. On the other hand, an H level WE1 signal and an H level WE2 signal are also inputted to the third scan line driver circuit 1841, the third scan line driver circuit 1841 transmits an H level signal to the gate line Gi of the i-th row, and the gate line Gi has the same potential as the H level signal. That is to say, the gate line Gi of the i-th row is selected by the third scan line driver circuit 1841. As a result, the switching transistor 11 included in the pixel 10 is turned on. Then, the potential of the power supply 53 included in the signal line driver circuit 1843 is transmitted to the gate electrode of the driving transistor 12, the driving transistor 12 is turned on or off, and the two electrodes of the light emitting element 13 have different potentials or the same potential. That is to say, the writing operation where the light emitting element 13 emits light or no light is performed in this period.

During the period T4 (fourth subgate selection period), the WE1 signal is at L level and the WE2 signal is at H level. Thus, an L level WE1 signal and an H level WE2 signal are inputted to the first scan line driver circuit 1839, the second scan line driver circuit 1840, and the third scan line driver circuit 1841; thereby the first scan line driver circuit 1839, the second scan line driver circuit 1840, and the third scan line driver circuit 1841 are brought into a floating state. On the other hand, an L level WE1 signal and an H level WE2 signal are also inputted to the fourth scan line driver circuit 1842, the fourth scan line driver circuit 1842 transmits an H level signal to the gate line Gi of the i-th row, and the gate line Gi has the same potential as the H level signal. That is to say, the gate line Gi of the i-th row is selected by the fourth scan line driver circuit 1842. As a result, the switching transistor 11 included in the pixel 10 is turned on. Then, the potential of the power supply 53 included in the signal line driver circuit 1843 is transmitted to the gate electrode of the driving transistor 12, the driving transistor 12 is turned on or off, and the two electrodes of the light emitting element 13 have different potentials or the same potential. That is to say, the writing operation where the light emitting element 13 emits light or no light is performed in this period.

In this manner, the gate line Gy is selected by the first scan line driver circuit 1839 during the period T1 (first subgate selection period), by the second scan line driver circuit 1840 during the period T2 (second subgate selection period), by the third scan line driver circuit 1841 during the period T3 (third subgate selection period), and by the fourth scan line driver circuit 1842 during the period T4 (fourth subgate selection period). That is to say, the gate line is controlled by the first scan line driver circuit 1839, the second scan line driver circuit 1840, the third scan line driver circuit 1841, and the fourth scan line driver circuit 1842 in a complementary manner. Further, the writing operation is performed during all of the first to fourth subgate selection periods.

That is to say, in the invention, the signal line driver circuit 1843 performs the writing operation four times during the writing period, so that a signal is outputted to each gate line Gy selected during the period T1, the period T2, the period T3, and the period T4.

In this embodiment mode, the scan period of the signal line driver circuit 1843 is required to be four times as long as usual. In order to achieve this, the frequency of SCK and SCKB of the signal line driver circuit 1843 may be increased, or a video signal may be divided into a plurality of signals.

The invention is not limited to the aforementioned mode where the gate selection period is divided into the four periods. The gate selection period may be divided into five or more periods or three or less periods. In addition, the writing operation and the erasing operation may be performed in any combination during divided gate selection periods. For example, the gate selection period may be divided into five periods, so that the writing operation is performed four times and the erasing operation is performed once.

An example of the signal line driver circuit 43 and the signal line driver circuit 1843 and an example of the decoder circuit 1341 are described below.

Figure 22:
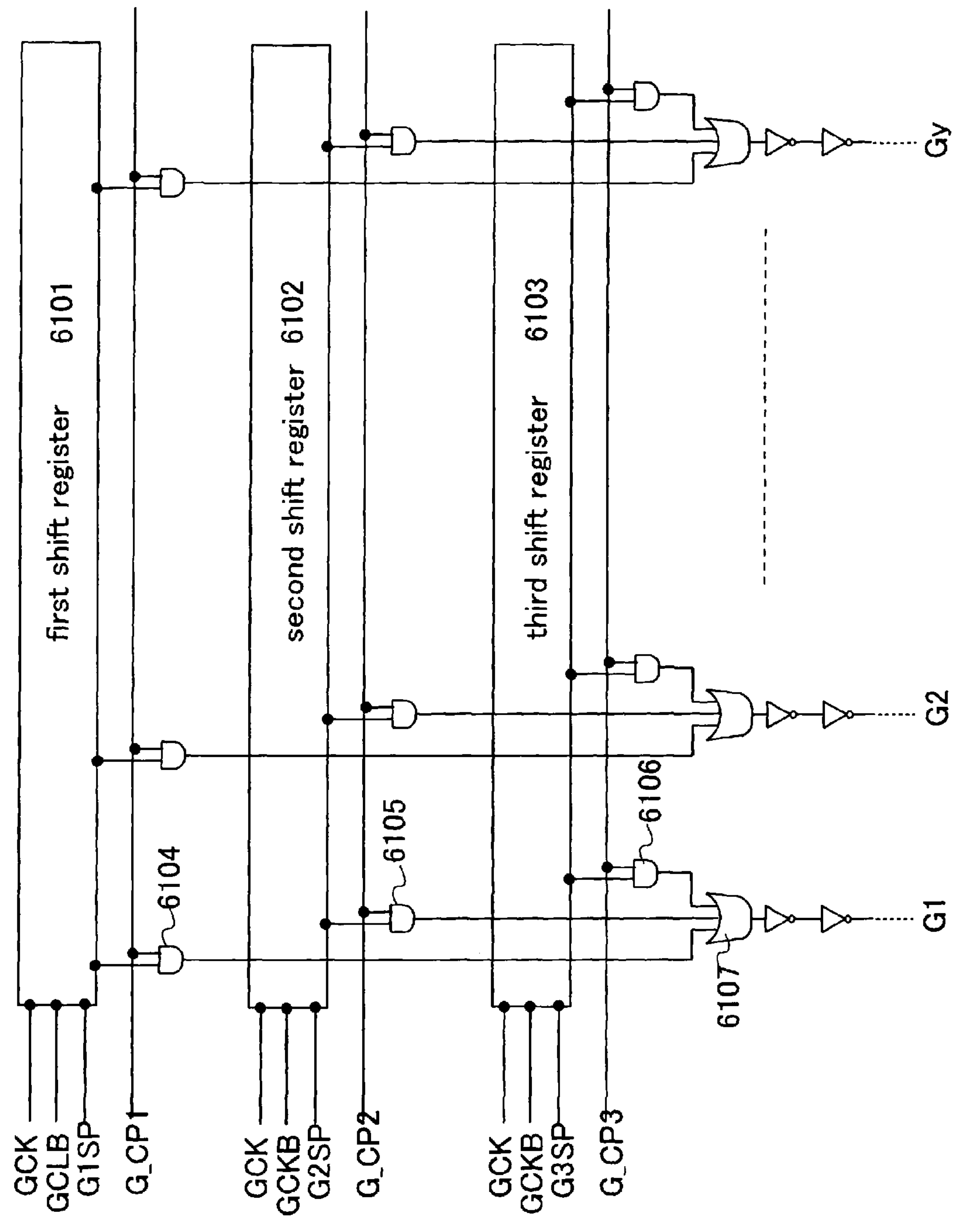
FIG. 22 shows a signal line driver circuit of the invention.

An example of the signal line driver circuit 43 and the signal line driver circuit 1843 is described with reference to FIG. 22.

A signal line driver circuit has a first shift register 6101, a second shift register 6102, a third shift register 6103, an AND circuit 6104, an AND circuit 6105, an AND circuit 6106, and an OR circuit 6107. Signals GCK, GCKB, and G1SP are inputted to the first shift register 6101, signals GCK, GCKB, and G2SP are inputted to the second shift register 6102, and signals GCK, GCKB, and G3SP are inputted to the third shift register 6103. An output terminal of the first shift register 6101 and G-CP1 are connected to an input terminal of the AND circuit 6104. An output terminal of the second shift register 6102 and G-CP2 are connected to an input terminal of the AND circuit 6105. An output terminal of the third shift register 6103 and G-CP3 are connected to an input terminal of the AND circuit 6106. Output terminals of the AND circuit 6104, the AND circuit 6105, and the AND circuit 6106 are connected to the OR circuit 6107. The stage of the gate line Gy to which a signal is outputted is determined by the combination of the output terminals of the first shift register 6101, the second shift register 6102, and the third shift register 6103, and the signals G-CP1, G-CP2, and G-CP3. According to the structure shown in FIG. 22, three subgate periods may be provided. However, the number of shift registers and the number of subgate periods are not specifically limited.

Figure 23:
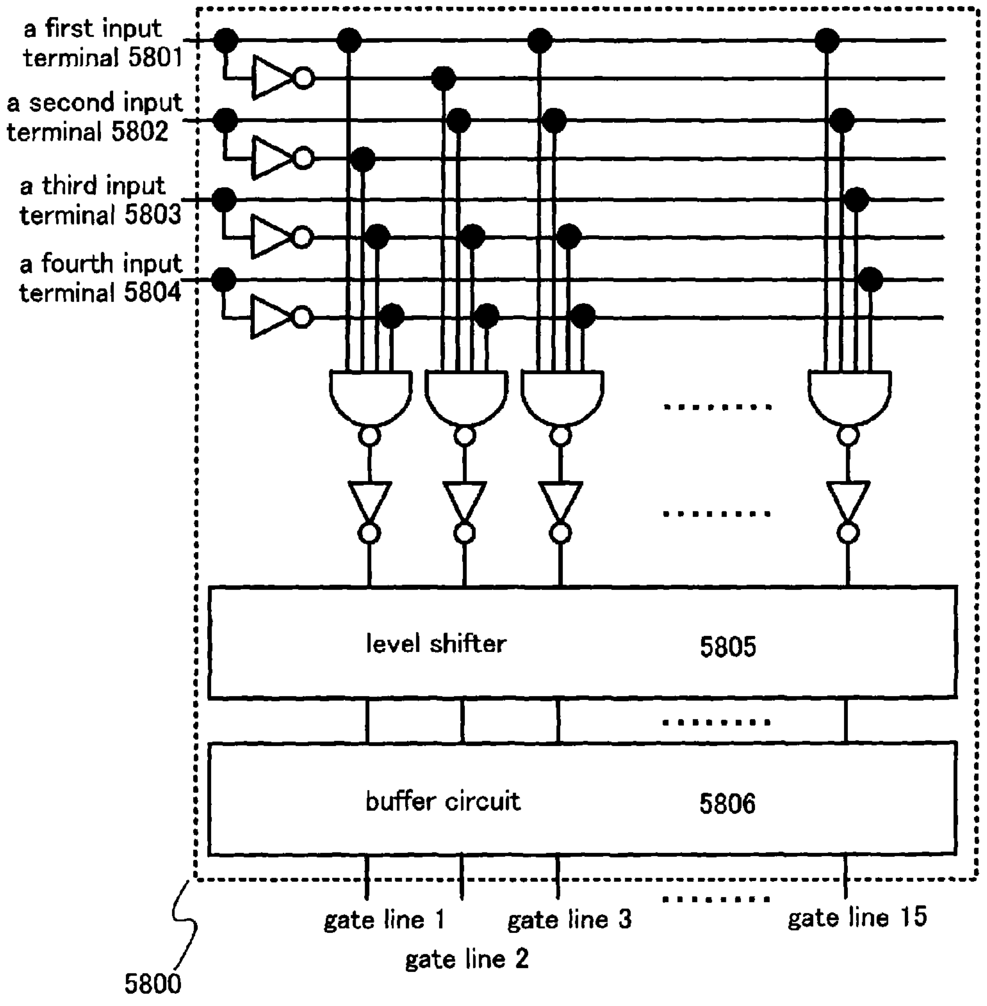
FIG. 23 shows a decoder circuit of the invention.

An example of the decoder circuit 1341 is described with reference to FIG. 23.

A decoder circuit has a NAND circuit with four input terminals, an inverter circuit, a level shifter 5805, and a buffer circuit 5806. The input terminals of the NAND circuit with four input terminals are connected to any four of a first input terminal 5801, a second input terminal 5802, a third input terminal 5803, a fourth input terminal 5804, an inverted input terminal of the first input terminal 5801, an inverted input terminal of the second input terminal 5802, an inverted input terminal of the third input terminal 5803, and an inverted input terminal of the fourth input terminal 5804. An output terminal of the NAND circuit with four input terminals is connected to an input terminal of the inverter circuit. An output terminal of the inverter circuit is connected to an input terminal of the level shifter 5805. An output terminal of the level shifter 5805 is connected to an input terminal of the buffer circuit 5806, and an output terminal of the buffer circuit 5806 is outputted as a gate line to a pixel. The combination of the inputs to the NAND circuit with four input terminals differs for each NAND circuit, and 16 kinds of outputs can be controlled in the case of FIG. 23.

Embodiment Mode 12

The invention can also be applied to a light emitting device that is driven with a constant current. Described in this embodiment mode is the case where the rate of changes with time is detected using the monitoring light emitting element 66 and a video signal or a power supply potential is corrected based on the detected result, thereby changes with time of a light emitting element are compensated.

In this embodiment mode, first and second monitoring light emitting elements are provided. A constant current is supplied from a first constant current source to the first monitoring light emitting element, and a constant current is supplied from a second constant current source to the second monitoring light emitting element. When the current value supplied from the first current source is made different from the current value supplied from the second current source, the total amount of current flowing through the first monitoring light emitting element is different from that through the second monitoring light emitting element. As a result, changes with time of the first and second monitoring light emitting elements progress at different rates.

The first and second monitoring light emitting elements are connected to an arithmetic circuit. The arithmetic circuit calculates the difference between the potential of the first monitoring light emitting element and the potential of the second monitoring light emitting element. The voltage value calculated by the arithmetic circuit is inputted to a video signal generating circuit. The video signal generating circuit corrects a video signal supplied to each pixel in accordance with the voltage value supplied from the arithmetic circuit. According to such a configuration, changes with time of the light emitting element can be compensated.

A circuit for preventing changes in potential, such as a buffer amplifier circuit may be provided between each monitoring light emitting element and each arithmetic circuit.

In this embodiment mode, as the pixel having a configuration driven with a constant current, for example, a pixel using a current mirror circuit, or the like may be used.

Embodiment Mode 13

The invention can also be applied to a passive matrix light emitting device. The passive matrix light emitting device has a pixel portion formed on a substrate, a column signal line driver circuit and a row signal line driver circuit that are provided at the periphery of the pixel portion, and a controller for controlling the driver circuits. The pixel portion has column signal lines arranged in the column direction, row signal lines arranged in the row direction, and a plurality of light emitting elements arranged in matrix. The monitor circuit 64 may be provided on the substrate on which the pixel portion is formed.

In the light emitting device according to this embodiment mode, video data inputted to the column signal line driver circuit or a voltage generated from a constant voltage source can be corrected by the monitor circuit 64 in accordance with changes in temperature and changes with time. Accordingly, the light emitting device where the effects due to changes in temperature and changes with time are reduced can be provided.

Embodiment Mode 14

As electronic apparatuses provided with a pixel portion having a light emitting element, there are a television set (also simply referred to as a television or a television receiver), a digital camera, a digital video camera, a mobile phone set (also simply referred to as a mobile phone), a portable information terminal such as a PDA, a portable game machine, a monitor for computer, a computer, an audio reproducing device such as a car audio set, an image reproducing device provided with a recording medium, such as a home game machine, and the like. Specific examples of them are described with reference to FIGS. 17A to 17F.

Figure 17A:
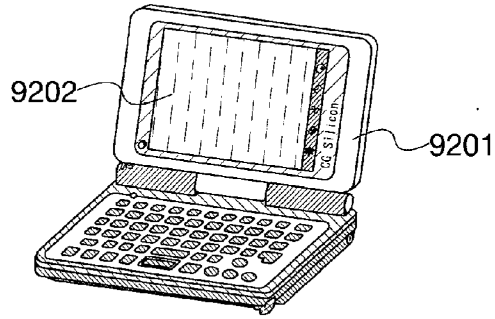
FIGS. 17A to 17F each shows an electronic apparatus of the invention.

A portable information terminal shown in FIG. 17A includes a main body 9201, a display portion 9202, and the like. The light emitting device of the invention can be applied to the display portion 9202. According to the invention for correcting a power supply potential supplied to a light emitting element using a monitoring light emitting element, it is possible to provide a portable information terminal where the effects of changes in current values of the light emitting element due to changes in ambient temperature and changes with time are suppressed.

Figure 17B:
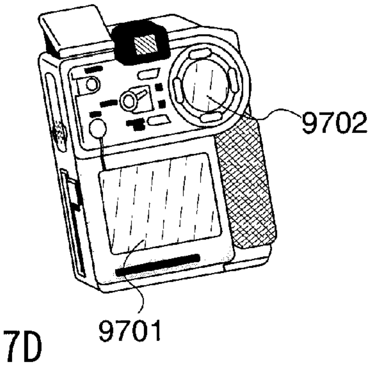

A digital video camera shown in FIG. 17B includes a display portion 9701, a display portion 9702, and the like. The light emitting device of the invention can be applied to the display portion 9701. According to the invention for correcting a power supply potential supplied to a light emitting element using a monitoring light emitting element, it is possible to provide a digital video camera where the effects of changes in current values of the light emitting element due to changes in ambient temperature and changes with time are suppressed.

Figure 17C:
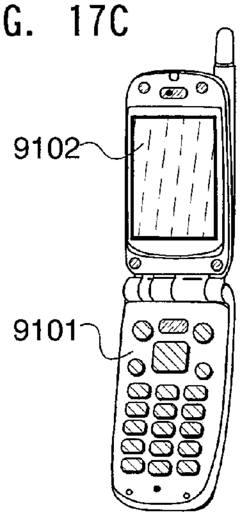

A mobile phone set shown in FIG. 17C includes a main body 9101, a display portion 9102, and the like. The light emitting device of the invention can be applied to the display portion 9102. According to the invention for correcting a power supply potential supplied to a light emitting element using a monitoring light emitting element, it is possible to provide a mobile phone set where the effects of changes in current values of the light emitting element due to changes in ambient temperature and changes with time are suppressed.

Figure 17D:
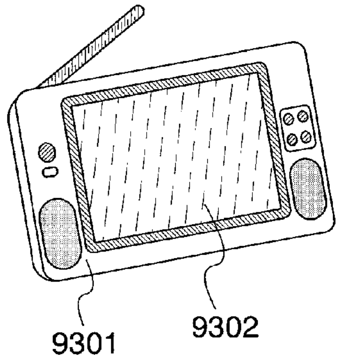

A portable television set shown in FIG. 17D includes a main body 9301, a display portion 9302, and the like. The light emitting device of the invention can be applied to the display portion 9302. According to the invention for correcting a power supply potential supplied to a light emitting element using a monitoring light emitting element, it is possible to provide a portable television set where the effects of changes in current values of the light emitting element due to changes in ambient temperature and changes with time are suppressed. The light emitting device of the invention can be widely applied to various television sets such as a small size one incorporated in a portable terminal such as a mobile phone set, a medium size one that is portable, and a large size one (e.g., 40 inches in size or larger).

Figure 17E:
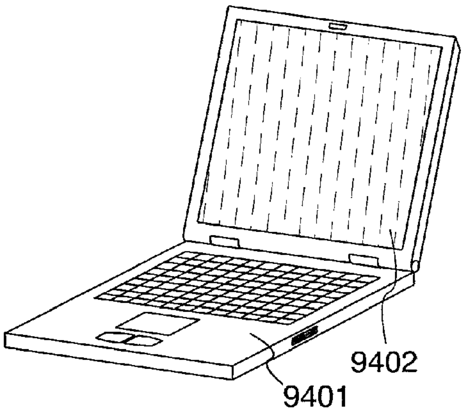

A portable computer shown in FIG. 17E includes a main body 9401, a display portion 9402, and the like. The light emitting device of the invention can be applied to the display portion 9402. According to the invention for correcting a power supply potential supplied to a light emitting element using a monitoring light emitting element, it is possible to provide a portable computer where the effects of changes in current values of the light emitting element due to changes in ambient temperature and changes with time are suppressed.

Figure 17F:
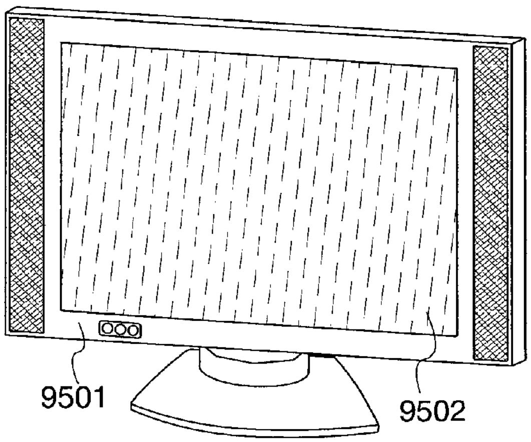

A television set shown in FIG. 17F includes a main body 9501, a display portion 9502, and the like. The light emitting device of the invention can be applied to the display portion 9502. According to the invention for correcting a power supply potential supplied to a light emitting element using a monitoring light emitting element, it is possible to provide a television set where the effects of changes in current values of the light emitting element due to changes in ambient temperature and changes with time are suppressed.

This application is based on Japanese Patent Application serial No. 2005-133807 filed in Japan Patent Office on May 2, 2005, the entire contents of which are hereby incorporated by reference.

What is claimed is:

1. A light emitting device for displaying an image by dividing one frame into a plurality of subframes, comprising:

a current source; a first wire; a second wire; a third wire; a fourth wire; a first light emitting element; a second light emitting element;

a third transistor including a source and a drain one of which is electrically connected to the first wire and the other is electrically connected to one electrode of the first light emitting element;

a first transistor including a source and a drain one of which is electrically connected to the second wire and the other is electrically connected to one electrode of the second light emitting element;

a second transistor including a source and a drain one of which is electrically connected to a gate of the first transistor and the other is electrically connected to the third wire, and a gate that is electrically connected to the fourth wire;

a circuit for turning the third transistor off when one electrode of the first light emitting element is short-circuited to the other electrode thereof;

a circuit for supplying a potential generated using a potential of the first wire to the second wire; and a circuit for selecting the fourth wire more than once in any one of the plurality of subframes, wherein the first light emitting element is electrically connected to the current source through at least the first wire and the third transistor.

2. The light emitting device according to claim 1, wherein the first transistor and the third transistor have the same polarity.

3. The light emitting device according to claim 1, wherein the circuit for selecting the fourth wire more than once in any one of the plurality of subframes is a decoder circuit.

4. The light emitting device according to claim 1, wherein the circuit for selecting the fourth wire more than once in any one of the plurality of subframes is a plurality of scan line driver circuits and a circuit for controlling whether output terminals of the plurality of scan line driver circuits are connected to the fourth wire.

5. The light emitting device according to claim 1, wherein the circuit for supplying a potential generated using a potential of the first wire to the second wire is a buffer amplifier circuit including a first input terminal that is electrically connected to the first wire, a second input terminal that is electrically connected to an output terminal, and the output terminal that is electrically connected to the second wire.

6. A driving method of the light emitting device according to claim 1, wherein a data signal is supplied to the third wire more than once in any one of the plurality of subframes, whereby weighting light emitting periods of the plurality of subframes.

7. A driving method of the light emitting device according to claim 1, wherein the plurality of subframes include at least one non-light emitting period.

8. A display module using the light emitting device according to claim 1.

9. An electronic apparatus using the display module according to claim 8.

10. A light emitting device for displaying an image by dividing one frame into a plurality of subframes, comprising:

a current source; a first wire; a second wire; a third wire; a fourth wire; a first light emitting element; a second light emitting element;

a third transistor including a source and a drain one of which is electrically connected to the first wire and the other is electrically connected to one electrode of the first light emitting element;

an inverter including an input terminal that is electrically connected to the other of the source and the drain of the third transistor and an output terminal that is electrically connected to a gate of the third transistor;

a first transistor including a source and a drain one of which is electrically connected to the second wire and the other is electrically connected to one electrode of the second light emitting element;

a second transistor including a source and a drain one of which is electrically connected to a gate of the first transistor and the other is electrically connected to the third wire, and a gate that is electrically connected to the fourth wire;

a circuit for supplying a potential generated using a potential of the first wire to the second wire; and a circuit for selecting the fourth wire more than once in any one of the plurality of subframes, wherein the first light emitting element is electrically connected to the current source through at least the first wire and the third transistor.

11. The light emitting device according to claim 10, wherein the first transistor and the third transistor have the same polarity.

12. The light emitting device according to claim 10, wherein the circuit for selecting the fourth wire more than once in any one of the plurality of subframes is a decoder circuit.

13. The light emitting device according to claim 10, wherein the circuit for selecting the fourth wire more than once in any one of the plurality of subframes is a plurality of scan line driver circuits and a circuit for controlling whether output terminals of the plurality of scan line driver circuits are connected to the fourth wire.

14. The light emitting device according to claim 10, wherein the circuit for supplying a potential generated using a potential of the first wire to the second wire is a buffer amplifier circuit including a first input terminal that is electrically connected to the first wire, a second input terminal that is electrically connected to an output terminal, and the output terminal that is electrically connected to the second wire.

15. A driving method of the light emitting device according to claim 10, wherein a data signal is supplied to the third wire more than once in any one of the plurality of subframes, whereby weighting light emitting periods of the plurality of subframes.

16. A driving method of the light emitting device according to claim 10, wherein the plurality of subframes include at least one non-light emitting period.

17. A display module using the light emitting device according to claim 10.

18. An electronic apparatus using the display module according to claim 17.

* * * * *